United States Patent [19]

Stewart et al.

[11] Patent Number: 5,274,779
[45] Date of Patent: Dec. 28, 1993

[54] DIGITAL COMPUTER INTERFACE FOR SIMULATING AND TRANSFERRING CD-I DATA INCLUDING BUFFERS AND A CONTROL UNIT FOR RECEIVING AND SYNCHRONIZING AUDIO SIGNALS AND SUBCODES

[75] Inventors: David Stewart, Sunnyvale; Robert Sloan, Palo Alto; Don Jackson, Mountain View; Maureen Arios, San Jose, all of Calif.

[73] Assignee: Sun Microsystems, Inc., Mountain View, Calif.

[21] Appl. No.: 560,884

[22] Filed: Jul. 26, 1990

[51] Int. Cl.⁵ ............................................. G06F 13/00
[52] U.S. Cl. .................................. 395/425; 395/250; 395/275; 364/239.2; 364/238; 364/DIG. 1; 84/609
[58] Field of Search ................... 395/425, 450, 275; 84/609

[56] References Cited

U.S. PATENT DOCUMENTS

| | | |
|---|---|---|
| 4,115,868 | 9/1978 | Suzuki et al. .................. 364/DIG. 2 |
| 4,607,348 | 8/1986 | Sheth .............................. 364/DIG. 2 |
| 4,931,879 | 6/1990 | Koga et al. ........................... 358/335 |
| 5,058,096 | 10/1991 | Ando et al. ........................... 369/100 |
| 5,093,750 | 3/1992 | Park et al. ............................ 360/19.1 |
| 5,138,925 | 8/1992 | Koguchi et al. ......................... 84/609 |
| 5,163,136 | 11/1992 | Richmond ............................ 395/275 |

FOREIGN PATENT DOCUMENTS 0233373 8/1987 European Pat. Off.

Primary Examiner—Lawrence E. Anderson
Attorney, Agent, or Firm—Blakely Sokoloff Taylor & Zafman

[57] ABSTRACT

The present invention provides for at least two levels of buffering in compensating for the delays from and out of the Unix workstation, thus achieving the required timebase correction. At the first level of buffering there is an eight Megabyte memory coupled to the VME bus of the Unix workstation over a disc simulator processor, which is sufficient to store about 45 seconds of audio data. The secondary level of data buffering is provided by an interface board which further buffers an additional 1.5 milliseconds between the first level of buffering and the second level of buffering. The outbound interface of the present invention comprises three separate registers to process the compact disc data when they are retrieved from the digital computer. Each of the registers comprises a plurality of FIFO registers. The first register receives outbound audio samples. The second register receives Q subcode data. The third register receives optionally QRSTUVW or RSTUVW subcode data. Instead of burdening the Unix software with the task of interleaving the subcodes, the present invention manages and manipulates the subcodes with the hardware of the interface. An inbound interface similar to that of the outbound interface is also provided for receiving and storing compact disc data. Thus, the present invention can store and replay compact disc data simultaneously.

24 Claims, 18 Drawing Sheets

DIGITAL COMPUTER INTERFACE FOR SIMULATING AND TRANSFERRING CD-I DATA INCLUDING BUFFERS AND A CONTROL UNIT FOR RECEIVING AND SYNCHRONIZING AUDIO SIGNALS AND SUBCODES

BACKGROUND OF THE INVENTION

1. Field of the Invention

The present invention relates to the field of recording and replaying digital data, and in particular, to a digital computer interface for simulating and transferring Compact Disc-Interactive (CD-I) data.

2. Art Background

In the music and recording industry, and increasingly in the data processing industry, it is quite common to store audio, video and text data on a compact disc and replay the same on a compact disc decoder. The compact disc is a record carrier for storing audio, video and text data as digital information according to certain formats such as the Compact Disc Digital Audio System (CDDA). CDDA provides for sampling audio data at 44,100 Hz, interleaving subcodes and others. See, *System Description of the Compact Disc Digital Audio* (Sony and N. V. Philips, April 1987). Subcode is an auxiliary data stream which is merged with the regular data and which has numerous functions among which are to assist in locating the beginning of the different data pieces on a compact disc and in providing a catalog of their location on the compact disc and their duration. A further vital function provided by the subcode is to convey the status of pre-emphasis in the recording so that de-emphasis can be automatically selected in the device accepting the compact disc. See, Watkinson, J. D., *The Art of Digital Audio* (Focal Press: 1989) pages 470-478. The compact disc decoder is a device that accepts compact discs, reads the information on discs, and converts the information thereon to: (a) analog audio signals, (b) digital audio signals and (c) subcode signals. The digital audio signals from a compact disc decoder is generated via the AES/EBU interface and its derivatives. The AES/EBU standard is a widely accepted serial transmission format for linearly representing digital audio data. See *AES Recommended Practice for Digital Audio Engineering—Serial Transmission Format for Linearly Representing Digital Audio Data*, Audio Engineering Society, J. Audio Eng. Soc. 33, 975-984 (1985); *Digital Audio Interface CP-340—Standards of Electronic Industries Association of Japan*, Engineering Department of Electronic Industries Association of Japan (September, 1987), pp. 2-6. The subcode signals are also encoded in the AES/EBU stream, and typically appear as displays on the front panel of the compact disc decoder. The compact disc decoder accepts simple commands, such as play, stop, pause, go to next track and etc. However, the compact disc decoder does not interpret information other than compact disc audio and subcodes.

More recently, the compact disc also finds application in interactive use, referred to as Compact Disc-Interactive (CD-I). A CD-I decoder is a device having a video display screen, an audio output, an input device (mouse, keyboard, or pointer), and an interface to various storage media including at least a compact disc decoder and optionally a floppy or hard disc. See D. C. Geest *Standardization of CD-I* Technical Paper presented at Microsoft Conference, Seattle, March 1986. Also see, for example, U.S. Pat. No. 4,794,465. In contrast to the compact disc decoder, the CD-I decoder interprets the program and data on the compact disc as well as compact disc audio and subcodes. The CD-I decoder typically receives data from the compact disc player over an AES/EBU interface and sends thereto simple commands, such as stop, play, jump, go to next track and etc.

The process of manufacturing or pressing a compact disc is expensive, and the turnaround time ranges from a few days to several weeks, depending on the availability of the factory. The digital information on a compact disc is essentially programs and data. If there are errors in the programs or in the logic of the programs or in the data itself, it would be useful to detect and correct such errors before the mass production of the compact disc begins.

It is therefore an object of the present invention to simulate with a digital computer the signals to a CD-I decoder accurately. It is a further object of the present invention to provide an interface for a digital computer for storing and replaying encoded CD-I data directly to and from commercial devices that support an AES/EBU standard or a consumer version thereof.

As will be described more fully below, the present invention provides a hardware solution to the task of simulating CD-I data. The present invention permits a digital computer to store digital data from commercially available CD-I decoder and to replay the same in real time. To store and replay real time, high quality digital audio, digital audio must be sampled at 44,100 Hz or approximately once every 22 microseconds. However, the input to and the output from a digital computer is bursty, and delay between data outputs and data inputs ranges from a few milliseconds to a full second. This delay arises because of contention for the use of buses and memory by different parts of a digital computer and disk seek delays and rotational latencies. It follows that the normal data inputs to and outputs from a digital computer is unacceptable for real time, high quality audio input and output. As such, a timebase correction is necessary to compensate for the bursty input and output of a digital computer. Timebase correction refers to the technique of running the computer or machine in advance of real time such that the correctly timed output signals will enable the digital audio to be sampled at every 22 microseconds or at 44,100 Hz. See Watkinson J., *The Art of Digital Audio*, (Focal Press: 1988), pages 76-84.

It is yet another object of the present invention to incorporate timebase correction in an AES/EBU audio interface to a digital computer for storing and replaying digital audio without further software assistance.

It is yet another object of the present invention to convert parallel, bursty computer data into synchronized data format suitable for transfer between computers coupled to a system bus.

There are several commercially available compact disc simulation systems on the market. Among them are TOPiX CD ROM Publishing System by Optical Media International, CD Publisher Trademark by Meridian Data, Disc Architect by TMS and The CD Simulator by Electroson. It is believed that none of the prior art compact disc simulation system provide real time digital audio. Furthermore, most of the prior art system rely on software to interleave the subcodes.

SUMMARY OF THE INVENTION

The present invention describes a digital computer interface for simulating and transferring CD-I data accurately. With the interface of the present invention and an auxiliary processor, a Unix workstation receives and stores CD-I data formatted as AES/EBU data streams. The CD-I data are automatically converted to programs and data suitable for storage in a Unix file. The programs and data are formatted to resemble compact disc sector data. With the same interface of the present invention, the CD-I data in the Unix file are replayed to a CD-I decoder or any commercially available compact disc decoder. The programs and data from the Unix file are outputted at the constant rate of 176,400 bytes per second, which conforms to the CD-I standards. Commands from the CD-I decoder are transmitted through the Unix workstations and controls the inputs and outputs of the Unix file. Thus, the present invention allows the user to simulate the signals to and from a CD-I decoder without actually pressing a compact disc.

The present invention provides for at least two levels of buffering in compensating for the delays of a digital computer, thus achieving the required timebase correction. At the first level of buffering, there is a eight Megabyte memory coupled to the VME bus of the Unix workstation over an auxiliary processor. This memory stores about 45 seconds of digital data. The secondary level of data buffering is provided by an interface board which further buffers an additional 1.5 milliseconds of data between the first level of buffering and the second level of buffering. The outbound interface of the present invention comprises three separate registers to process the digital data when they are retrieved from the digital computer. Each of the registers comprises a plurality of FIFO registers. The first register receives outbound audio samples. The second register receives Q subcode data. The third register receives optionally QRSTUVW or RSTUVW subcode data. Instead of burdening the Unix software with the task of interleaving the subcodes, the present invention manages and manipulates the subcodes with the hardware of the interface. The subcode is an auxiliary data stream which is merged with the audio data and which has numerous functions among which are to assist in locating the beginning of the different musical pieces on a compact disc and in providing a catalog of their location on the compact disc and their duration. A further vital function provided by the subcode is to convey the status of pre-emphasis in the recording so that de-emphasis can be automatically selected in the CD-I decoder. An inbound interface similar to that of the outbound interface is also provided for receiving and storing compact disc data. Thus, the present invention can store and replay compact disc data simultaneously.

DETAILED DESCRIPTION OF THE INVENTION

A digital computer interface is disclosed for simulating CD-I data for a CD-I decoder. The interface permits the digital computer to receive, convert and store CD-I data in its memory, and to retrieve therefrom and to replay CD-I data in real time to a CD-I decoder. Furthermore, the digital computer may transfer the CD-I data to other computers equipped with the same interface over a network link. In the following description, for the purpose of explanation, numerous details are set forth such as specific circuit elements, digital signals, digital formats, etc., in order to provide a thorough understanding of the present invention. However, it will be apparent to one skilled in the art that the invention may be practiced without these specific details. In other instances, well-known components, structures, and electrical processing means have not been described in detail in order not to obscure the present invention unnecessarily.

Figure 1A:
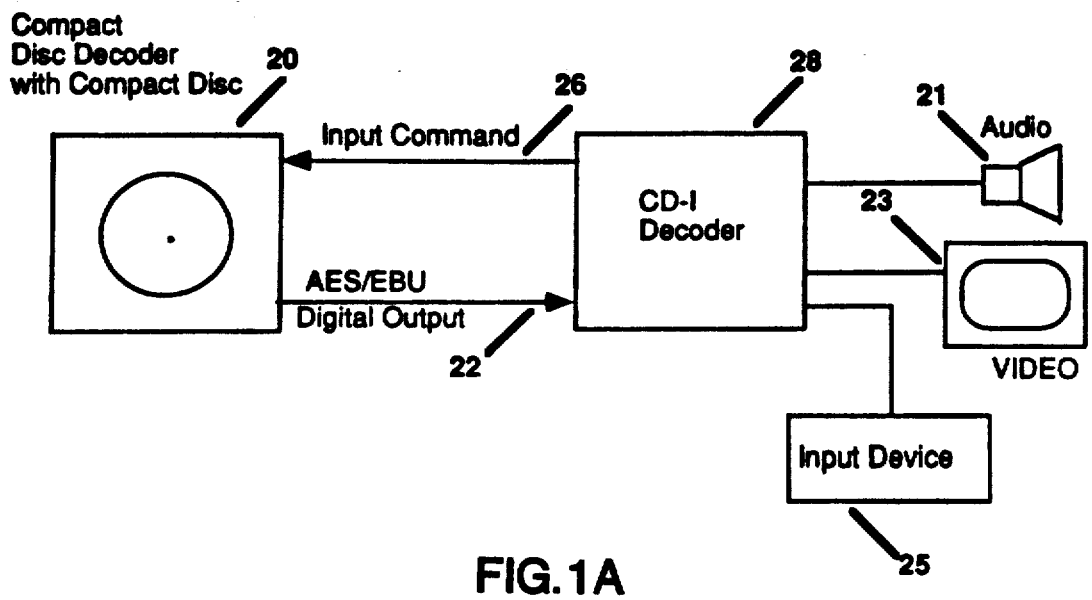
FIG. 1A is a diagram illustrating a prior art compact disc decoder coupled to a CD-I decoder.

Referring now to FIG. 1A, a prior art compact disc decoder is illustrated which allows user to replay CD-I data on a compact disc. A compact disc decoder 20 is coupled to a CD-I decoder 28 over an AES/EBU digital output line 22. The analog audio signals from the compact disc decoder 20 are outputted from the CD-I decoder 28 to an audio output device 21, while the video signals are outputted from the CD-I decoder 28 to video display unit 23. It should be understood by one skilled in the art that the audio output device 21 comprises speakers and typically has at least a left and a right channel configuration. It should also be understood by one skilled in the art that the video display unit may take the form of any of several well-known varieties of CRT displays and high definition displays. An input device 35 such as a mouse, keyboard, or pointer is provided for sending commands from CD-I decoder 28 to the compact disc 20 over a command input line 26. Like the AES/EBU digital output line 22, the input command line 26 is a digital link between the CD-I decoder 28 and the compact disc unit 20. It should be further understood that the audio output device 21, the video display unit 23 and the input device 25 may be integrated with the CD-I decoder 28 or be integrated with each other as an external stand-alone unit. An example of a prior art compact disc system is described in U.S. Pat. No. 4,794,465.

The process of manufacturing or pressing a compact disc is expensive, and the turnaround time ranges from a few days to several weeks depending on the availability of the factory. Errors in the compact disc data, such as mistakes in the logic of the program or in the data, are costly and, above all, irreversible. Therefore, it is useful to detect and correct such errors before the mass production of the compact disc begins. Prior art compact disc simulators require extensive physical and electrical handling before compact disc data can be simulated. Digital computers are adept and efficient in handling and manipulating digital information, such as digital audio. It is therefore an object of the present invention to provide an interface to a digital computer for simulating and transferring CD-I data accurately.

Figure 1B:
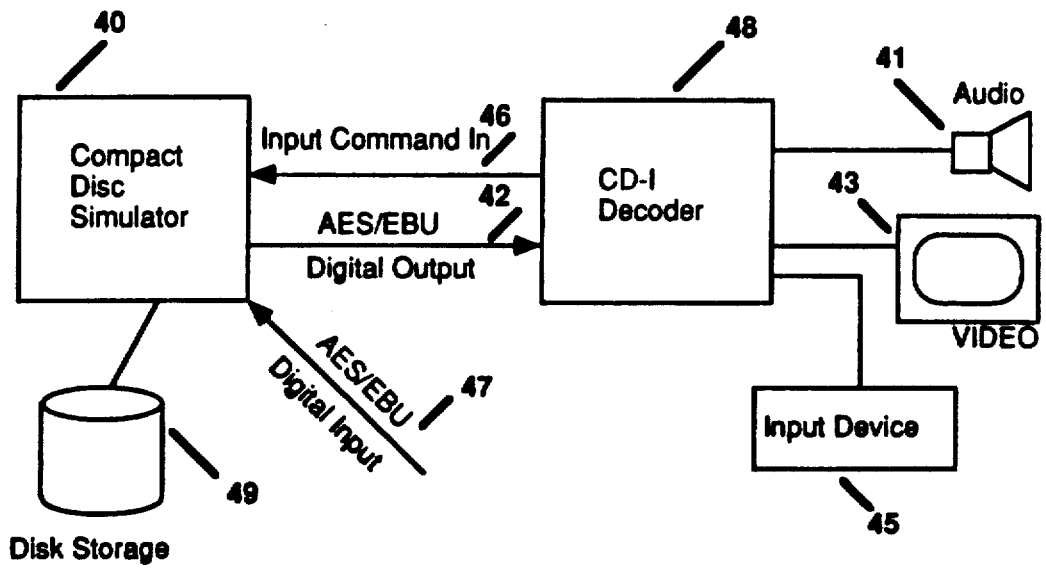
FIG. 1B is a block diagram of the present invention illustrating the use of the compact disc simulator with a CD-I decoder.

FIG. 1B is a block diagram illustrating the preferred embodiment of the present invention. In place of the compact disc decoder 20 in FIG. 1A is a compact disc simulator 40 in FIG. 1B. The compact disc simulator 40 is coupled to a CD-I decoder 48 over an identical AES/EBU digital output line 42 and an identical command line 44. The audio data from the compact disc simulator 40 is outputted from the CD-I decoder 48 to an audio output device 41, while the video data is outputted to a video display unit 43. An input device 45 is coupled to the CD-I decoder 48 for sending commands from the CD-I decoder 28 to the compact disc simulator 40 over an input command line 46. It should be understood by one skilled in the art that except for the compact disc simulator 40, FIG. 1B and FIG. 1A are identical. The compact disc simulator 40 of the present invention is further coupled to a magnetic disk storage 49. Finally, the compact disc simulator 40 is coupled to an AES/EBU digital input 47 for receiving inputs therefrom.

Figure 2:
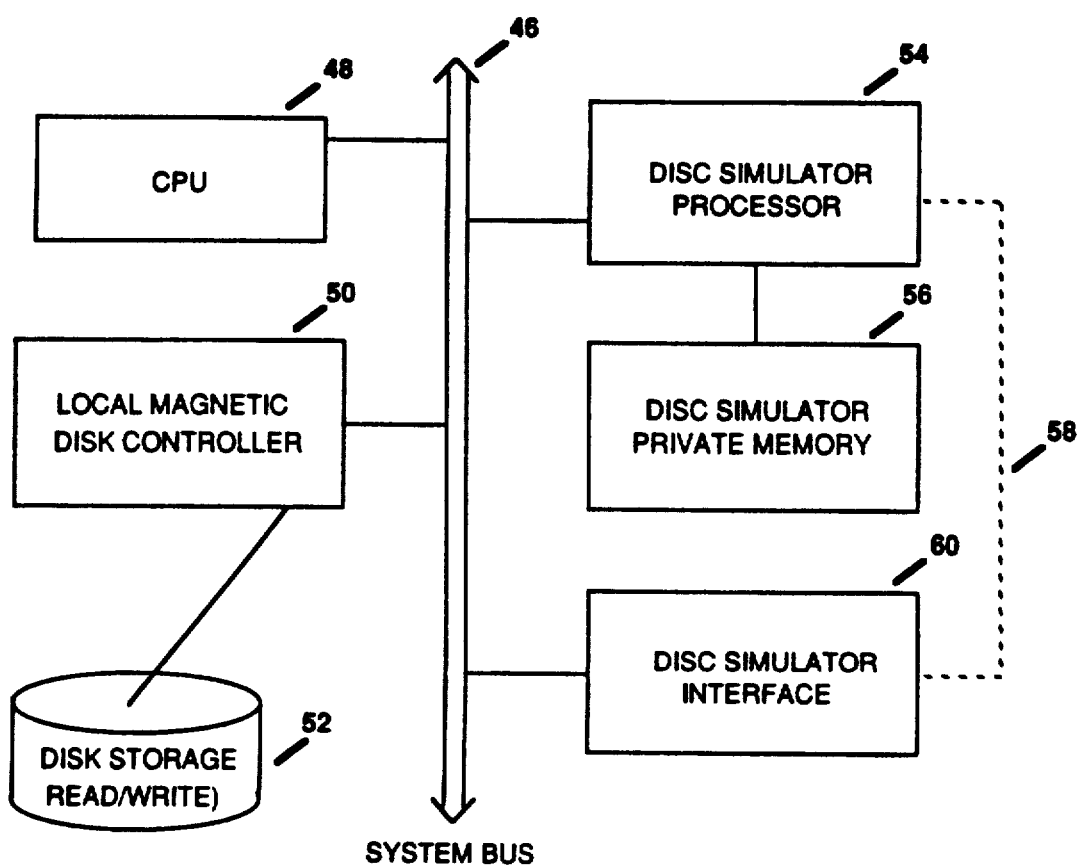
FIG. 2 is a block diagram of a digital computer system coupled with an interface in accordance with the teachings of the present invention.

FIG. 2 is a block diagram illustrating a digital computer system used in the preferred embodiment of the present invention. The computer system comprises a system bus 46 which is further coupled to a central processing unit (CPU) 48 and to a local writeable disk controller 50 and a disk storage device 52. In the preferred embodiment of the present invention, a VME bus is employed as the system bus. See *VME bus Specification Manual, Revision C.* 1, (Micrology pbt, Inc.: October 1985). Particular examples of suitable digital computer to fill the role of the computer include machines manufactured by Sun Microsystems, Inc., Mountain View, Calif. Other machines having like capabilities may, of course, be adapted in a straight-forward manner to perform the several functions described below.

Referring now again to FIG. 2, a disc simulator processor 54 is coupled to the system bus 46. A disc simulator private memory 56 is connected to the disc simulator processor 54. At the same time, a disc simulator interface 60 is coupled to the system bus 46. An optional connection 58 permits the disc simulator processor 54 to communicate directly with the disc simulator interface 60. Particular examples of suitable processors to fill the role of disc simulator processor 54, include the Sun 4/260 processor manufactured by Sun Microsystems, Inc., Mountain View, Calif. Another example of suitable memory to fill the role of disc simulator private memory 56 is a Sun Microsystems 8-Megabyte memory card. Other processors and memories having like capabilities may, of course, be adapted in a straight-forward manner to perform the several functions described below. With disc simulator processor 54, disc simulator private memory 56, and disc simulator interface 60, a digital computer coupled thereto is able to receive, store, and replay digital audio data. The input and output of digital audio data is via the disc simulator interface 60. The CPU 48 determines where and when such digital audio data will be stored and retrieved and sends instruction to the local magnetic disc controller 50, which causes the disc storage 52 to read or write and transfer samples between the disc simulator interface 60 and the disc storage device 52. Suitable disc storage devices may include magnetic disc drives, magneto-optic drives or similar magnetic storage devices. The disc storage device 52 cannot supply digital audio data at a constant rate because of gaps between blocks, defective blocks, and/or the need to move the head of the disk controller from one track to another. In order to accept a steady audio sample stream for storage and to return it in the same way during the replay of these audio sample streams, timebase correction is necessary. In the preferred embodiment of the present invention, timebase correction is provided by disc simulator private memory 56 and disc simulator interface 60. Under the control of the CPU 48, the disc simulator processor 54 writes a copy of the digital audio data from the disc storage device 52 into the disc simulator private memory 56. The disc simulator processor 54 manages the buffering of the digital audio data in the disc simulator private memory 56—this being the first level of timebase correction. The second level of timebase correction is achieved when the disc simulator interface 60 buffers the digital audio data from the disc simulator private memory 56. In an alternative embodiment of the present invention, a DMA controller may be used in place of the local magnetic disk controller 50, the disk storage 52, and the disc simulator private memory 56. Here, the first level of timebase correction takes place in the CPU's memory under the control of the DMA controller. The details of this second level of timebase correction shall be described below.

Figure 3:
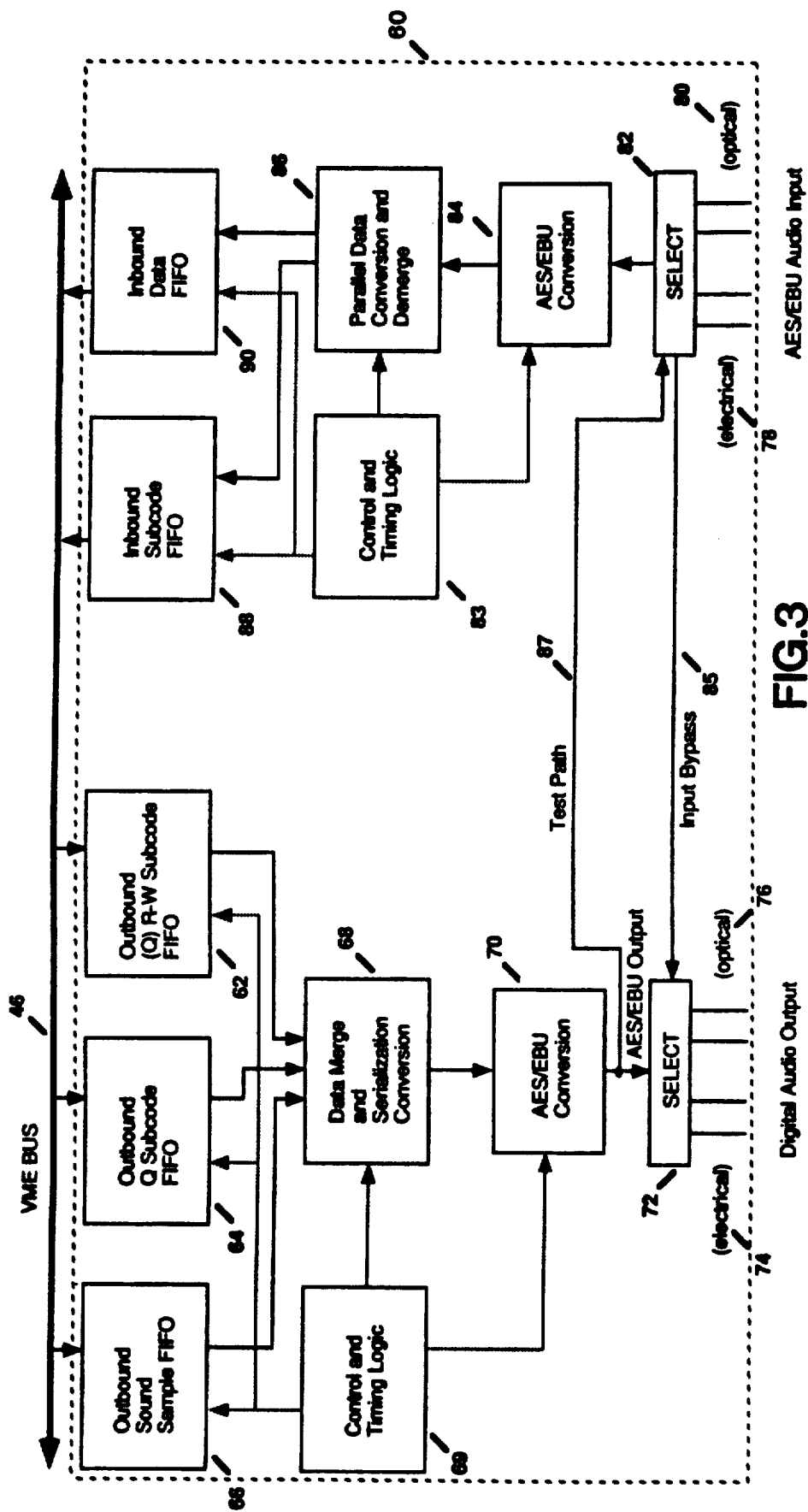
FIG. 3 is a block diagram of the interface of the preferred embodiment of the present invention.

FIG. 3 is a block diagram of the disc simulator interface used in the preferred embodiment of the present invention. Disc simulator interface 60 is shown coupled to the VME system bus 46 of a digital computer. Preferably, the digital computer is a workstation running the Unix operating system (Unix is a trademark of AT&T). The interface 60 further comprises an inbound path for receiving digital audio and an outbound path for retrieving digital audio from the disc storage 52 and output the same to commerically available compact disc decoders, such as those manufactured by N. V. Philips and Sony. The inbound path comprises at least four AES/EBU audio input ports 78 and 80 and is coupled to an inbound selector unit 82, an AES/EBU conversion unit 84, a parallel data conversion/demerge unit 86, an inbound control and timing logic unit 83 and to at least two inbound FIFOs 88 and 90. The outbound path comprises an outbound audio sample FIFO 66, an outbound Q subcode FIFO 64 and an outbound (Q) R-W subcode FIFO 62. Under the control of the outbound control and timing logic unit 69, the three outbound FIFO's provide the audio sample and the subcode information retrieved from the disk storage. The subcode information and audio data are merged in the data merge unit 68 and converted into the AES/EBU format by the AES/EBU conversion unit 70 before being outputted to the outbound select unit 72 and further onto the digital audio output ports 74 and 76. The inbound selector 82 is coupled to the outbound selector 72 over a input bypass line 85. The output from the Outbound AES/EBU conversion unit is coupled to the inbound selector 82 over a test path line 87.

The novel feature of the present invention lies with the outbound path of the interface 60. As such, for the remainder of the description below, the structure and function of the outbound path shall first be described and then be followed by the inbound path. In the preferred embodiment of the present invention, the system bus 46 is a VME bus, a 32-bit parallel bus. The interface 60 is coupled to the VME bus via at least two, three-row 96-way IEC-603-2 connectors. All VME bus signals conform to TTL logic levels and the bus lines are driven by totem-pole, tri-state, and open-collector drivers. For further information with respect to the bus format specification and the data transfer protocols of the VME system bus, please refer to *VME bus Specification Manual. Revision C.1*, (Micrology pbt, Inc.: October 1985). It is with the contemplation of the present invention that other buses or communication links may be adopted in a straight forward manner to implement the teachings of the present invention. For example, the CD-I data may be transferred from the disk storage 52 to a CD-I decoder over a S bus. Alternatively, the CD-I data may be transferred from one disk storage of a digital computer to the memory of another digital computer coupled to the same system bus.

Figure 4A:
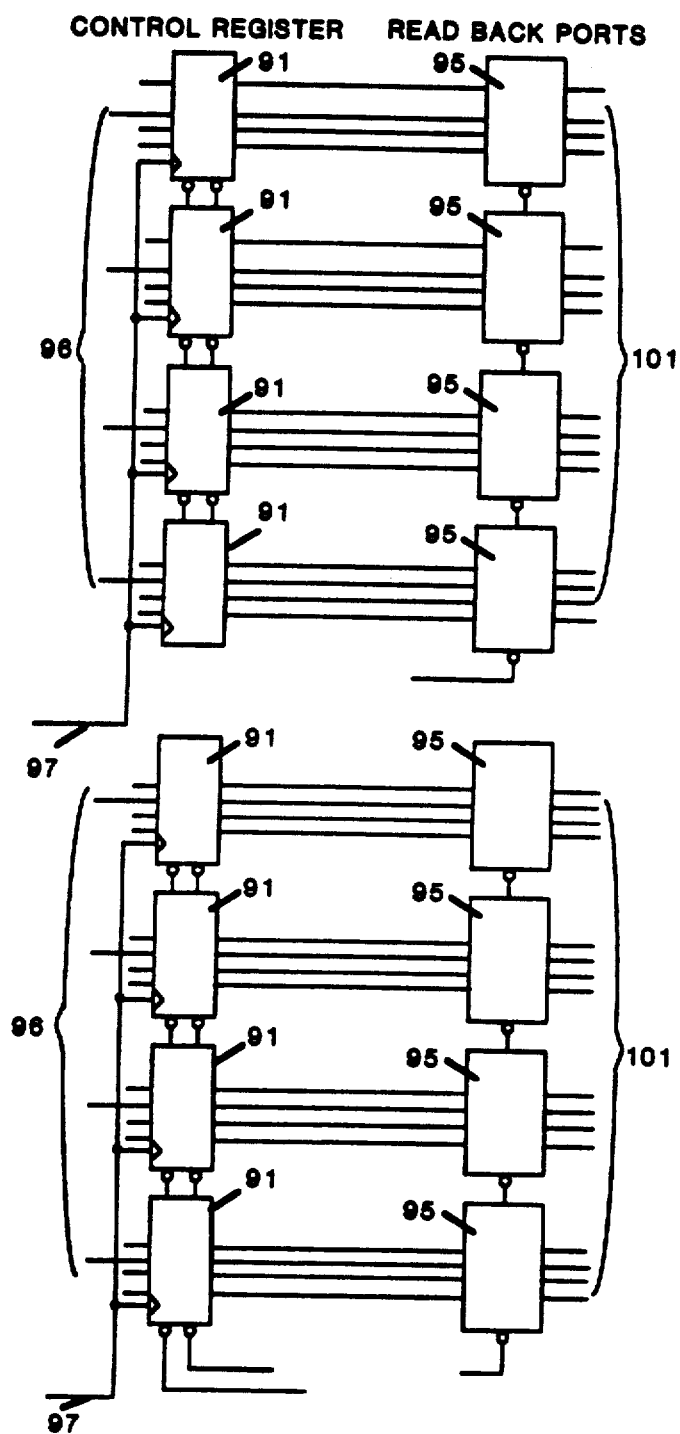
FIGS. 4A and 4B are circuit diagrams of the control and status register used in the preferred embodiment of the present invention.
Figure 4B:
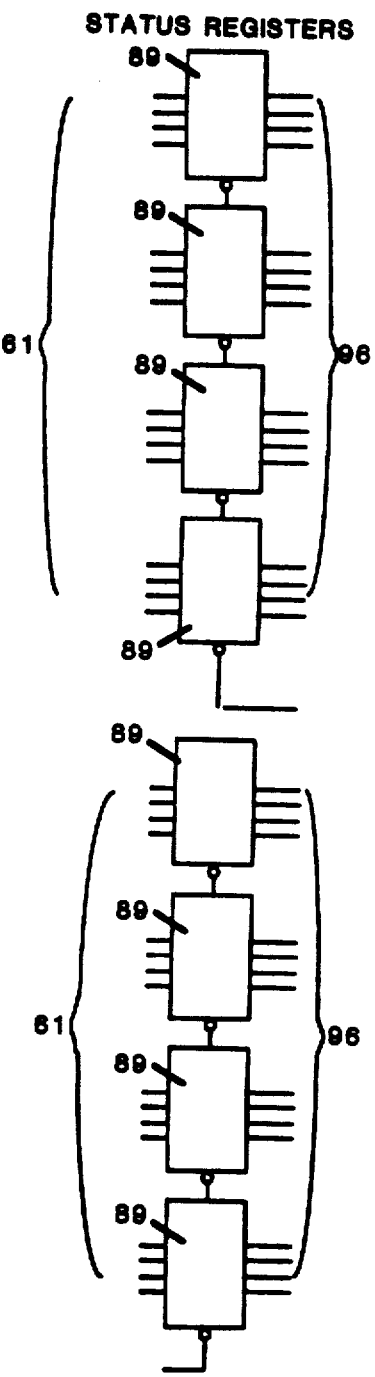

FIGS. 4A and 4B are circuit diagrams of the control and status registers for disc simulator interface 60. The two sets of registers on the left hand column are the control registers, and the two sets of registers on the right hand column are the status registers. The control and status registers comprise a plurality of latches 91 coupled to a plurality of read back ports or tri-state output drivers 95. The tri-state output drivers permit the disc simulator processor 54 to read the value of the control and status registers via the VME system bus 46. The tri-state output drivers also allow the VME system bus to be shared by components coupled thereto. The control registers receive inputs from the VME system bus 46 via input ports 96. The outputs from the control registers are also coupled to ports 96 which is the data bus. The status registers comprise a plurality of registers 89. The registers 89 receive inputs 61 from various circuits of the disc simulator interface 60 for monitoring their status. The outputs of the status registers 89 are coupled to the data bus 96. The control and status registers of the disc simulator interface 60 allow the user to set various speed options. In other words, CD-I data may be transferred at 48,000 Hz, 44,100 Hz, 37,800 Hz or 32,000 Hz—all of these speeds conforming to the CD-I standards. The control and status registers of the disc simulator interface 60 send control signals to four different clocks located in the control and timing logic 69.

The control and status registers are a pair of 32-bit registers physically located on the disc simulator interface 60. They are both accessible over the VME bus 46. The control registers control the board functions. The status register gives resulting status information. As such, it is not writeable, since it would serve no purpose. The control registers control the following functions:

1) board reset;
2) data rate 48, 44.1, 37.8 and 32 KHz;
3) output select (from Disk Simulator Interface or copy from input port selection);
4) force errors into output for testing;
5) enable/disable subcode merge
6) enable/disable data out;
7) enable/disable loopback test;
8) stereo/mono mode (copies left channel onto right);
9) enable interrupt on Data out FIFO empty (end of data)
10) enable data in function;
11) input selection (1 of 4 input connectors);
12) force muting of output; and
13) attenuate output; and
14) Select meaning of 2 status bits.

The status register informs the software about the current state of:

1) error detected in incoming data;
2) data in and out FIFO capacity remaining full, almost full, half full, almost empty, empty;
3) data in FIFO has overflowed (data lost) sticky bit;
4) data out FIFO has run out of data;
5) subcode FIFO's (in or out) overruns/underruns.
6) rate of incoming data (32, 44.1, 37.8 and 48 KHz); and
7) CD and DAT copy protected input.

Figure 5A:
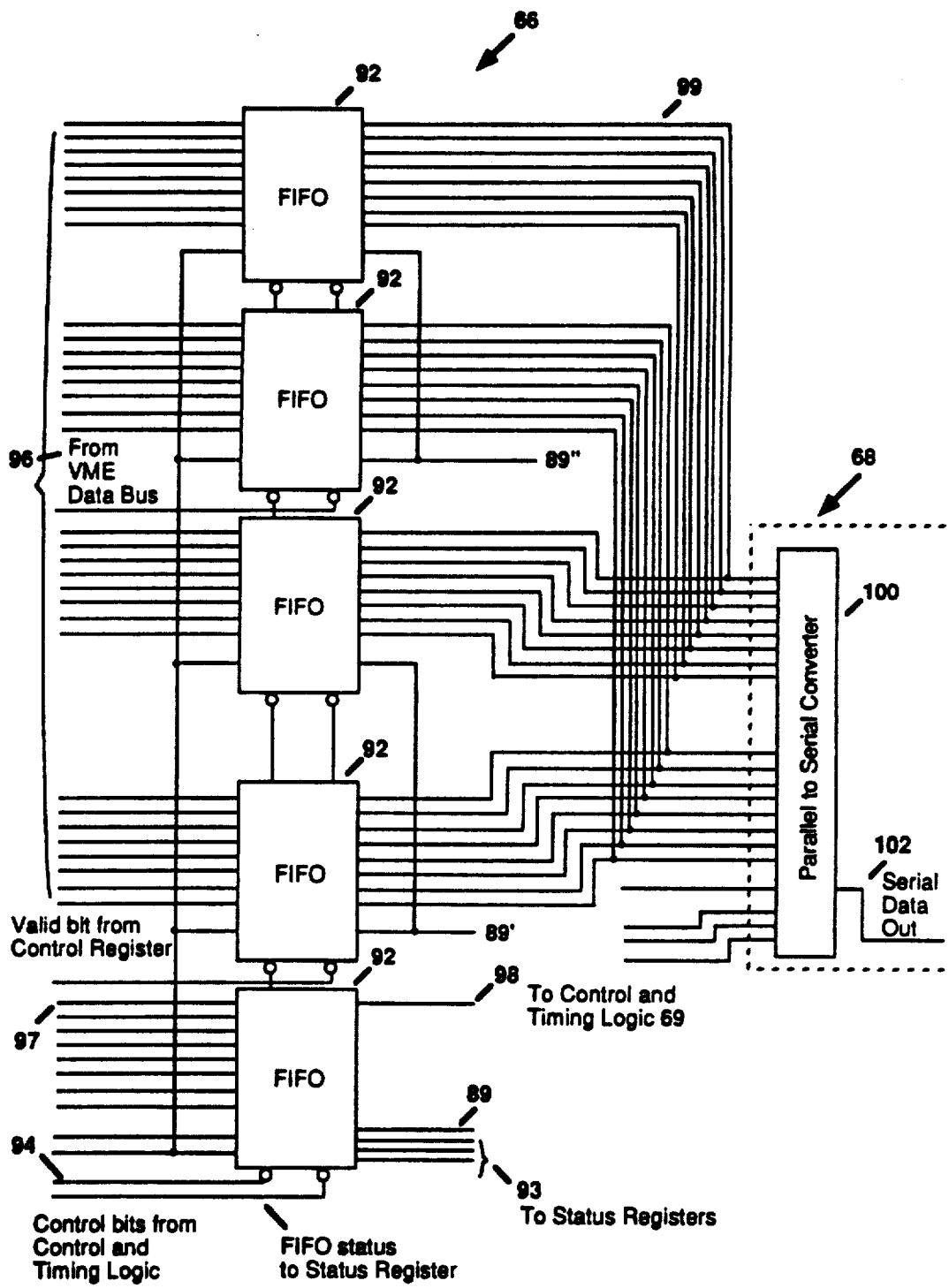
FIG. 5A is a circuit diagram of the outbound sound sample FIFOs used in the preferred embodiment of the present invention.

FIG. 5A is a circuit diagram of the outbound sound sample FIFO 66 of the disc simulator interface 60. The outbound sound sample FIFO comprises a plurality of FIFO registers 92. In the preferred embodiment of the present invention, CY7C408 registers are used as registers 92. The outbound sound sample FIFO 66 receives and holds digital audio data from the VME system bus 46 via input ports 96. The digital audio data is outputted to a parallel to serial converter 100 in the data merge unit 68 via channels 99 under control of clocks generated in the timing and control logic 69 and sent via signal 89, 89', 89''. Subsequently, the time multiplexed digital audio data are converted from parallel computer data into serial data stream by the parallel to serial converter 100. Outbound sound sample FIFO 66 also receives a valid bit from the control register via input port 97. The outbound sound sample FIFO also performs the last level of time base correction before the digital audio data is converted from parallel computer data into AES/EBU digital audio output signals.

The purpose of the valid bit is to force errors into the data stream to make sure that the error correction software of the CD-I decoder is functioning properly. In normal operation, the CD-I data needs to be validated. Sometimes data read from the compact disc cannot be recovered due to fingerprints and dust. Thus, the compact disc manufacturers add logic to detect errors and flag them. This is the purpose of the valid bit. Data is sent continuously, even when it is known to be in error, but the valid bit is turned off to signal data errors.

Referring again to FIG. 5A, the valid bit 97 is left valid. When software writes data into the outbound sound sample FIFO 66, a copy of the control register valid bit is latched into the FIFO so that each data element (32 bits) written into the FIFO gets its own valid bit, which is interleaved with the data through the FIFO appearing at the output 98. To simulate an error, the valid bit is turned invalid in the control register. Any data written to the outbound sound sample FIFOs from the VME bus 46 will also latch the 'invalid data' state of this bit which is further propagated out. The FIFO valid bit goes into a PAL which is part of the control and timing logic 69. It comes out, properly synchronized and goes into the AES/EBU conversion unit 70.

Referring again to FIG. 5A, the outputs 93 from the last FIFO in the outbound sound sample FIFO 66 comprise three status bits for providing information to the status register telling the disc simulator software how full the FIFO 92 is. It is important not to "overfill" or let the FIFO go "empty." Thus, the three status bits 93 are coupled to status registers in FIGS. 4B to monitor the level of the FIFO's data.

Figure 5C:
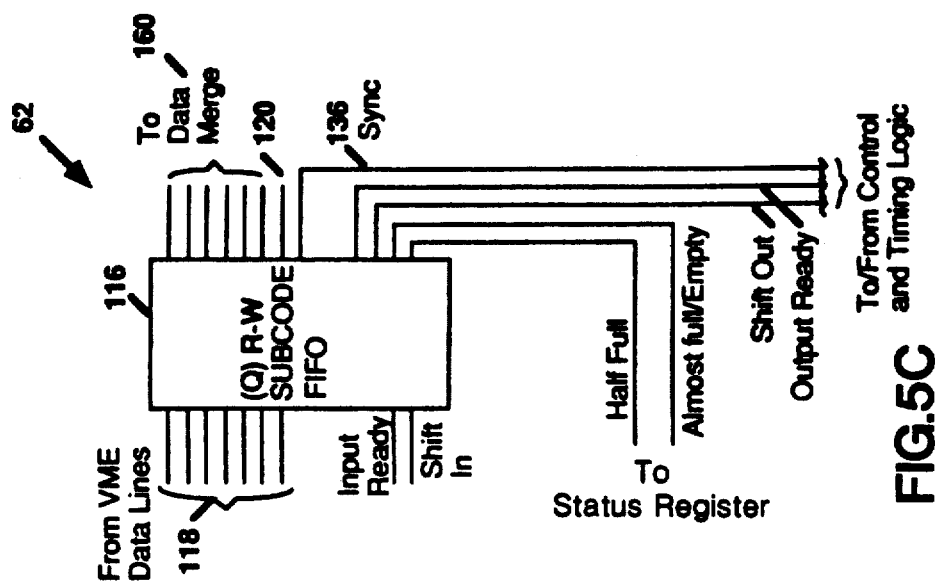
FIG. 5C is the circuit diagram of the outbound (Q) R-W subcode FIFO of the present invention.
Figure 5B:
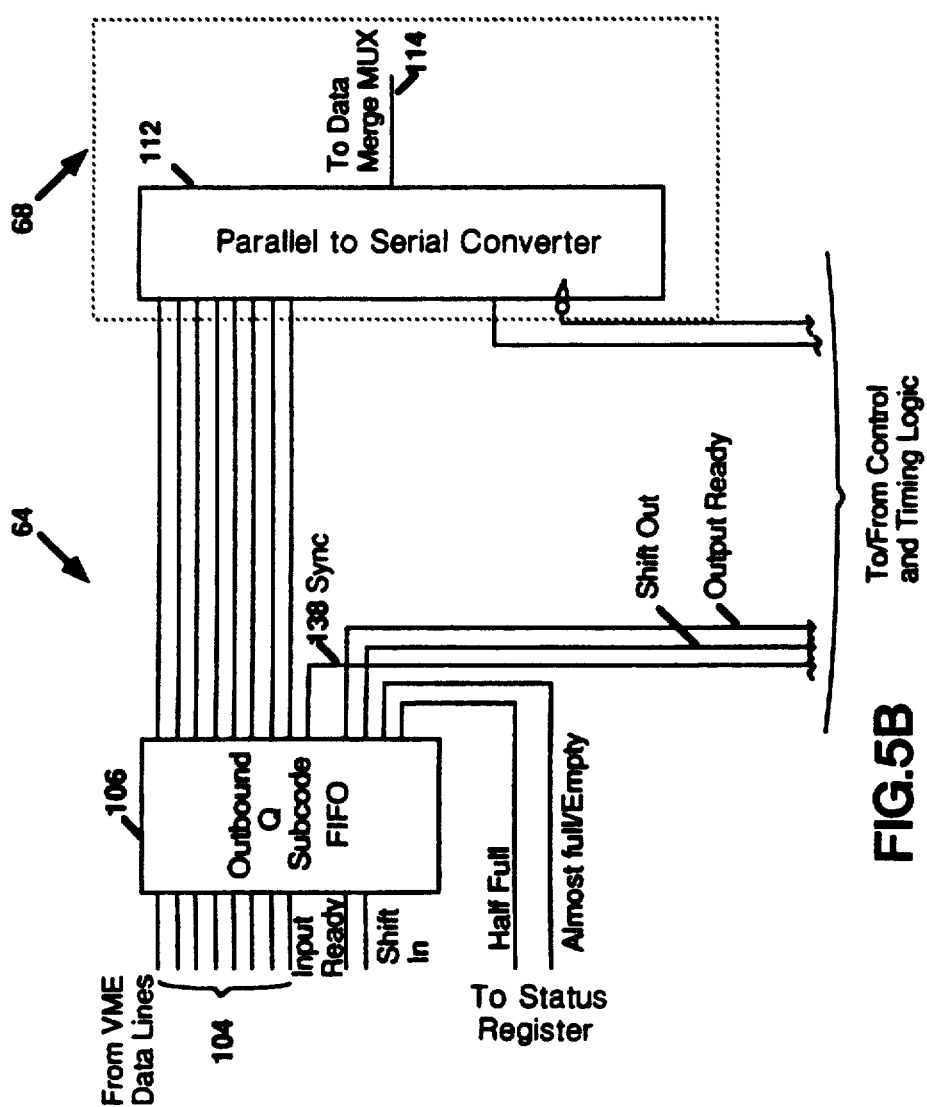
FIG. 5B is the circuit diagram of the outbound Q subcode FIFO used in the preferred embodiment of the present invention.

FIG. 5B is a circuit diagram of the outbound Q subcode FIFO 64. Preferably, CY7C409 register is used as FIFO 64. The outbound Q subcode FIFO 64 comprises a FIFO 106 having a eight-channel input 104 coupled to the VME system bus for receiving subcode data therefrom. The FIFO 106 further has a eight-channel output coupled to a parallel-to-serial converter 112 in the data merge unit 68 for transferring thereto subcode data retrieved from the disk storage 52 of the computer system. Subcode is an auxiliary data stream clocked by the input ready line and is merged with the audio samples described in FIG. 5A and which has numerous functions. One of these is to assist in locating the beginning of the different programs on a compact disc and providing a catalog of their locations on the compact disc as well as their durations. A further vital function is to convey the status of pre-emphasis in the recording so that de-emphasis can be automatically selected in the compact disc decoder or players.

Figure 5D:
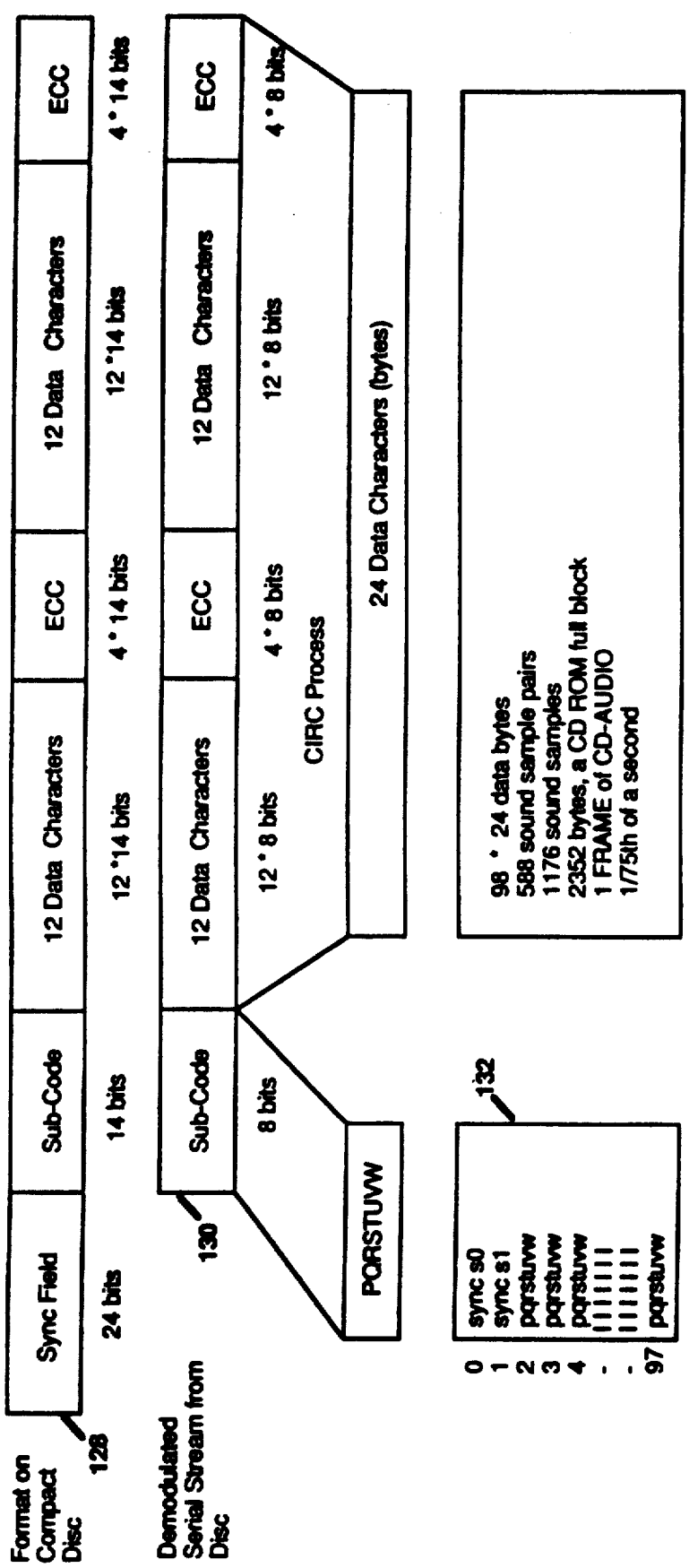
FIG. 5D illustrates the organization of the CD-I data on a compact disc and particularly the subcodes.
Figure 5E:
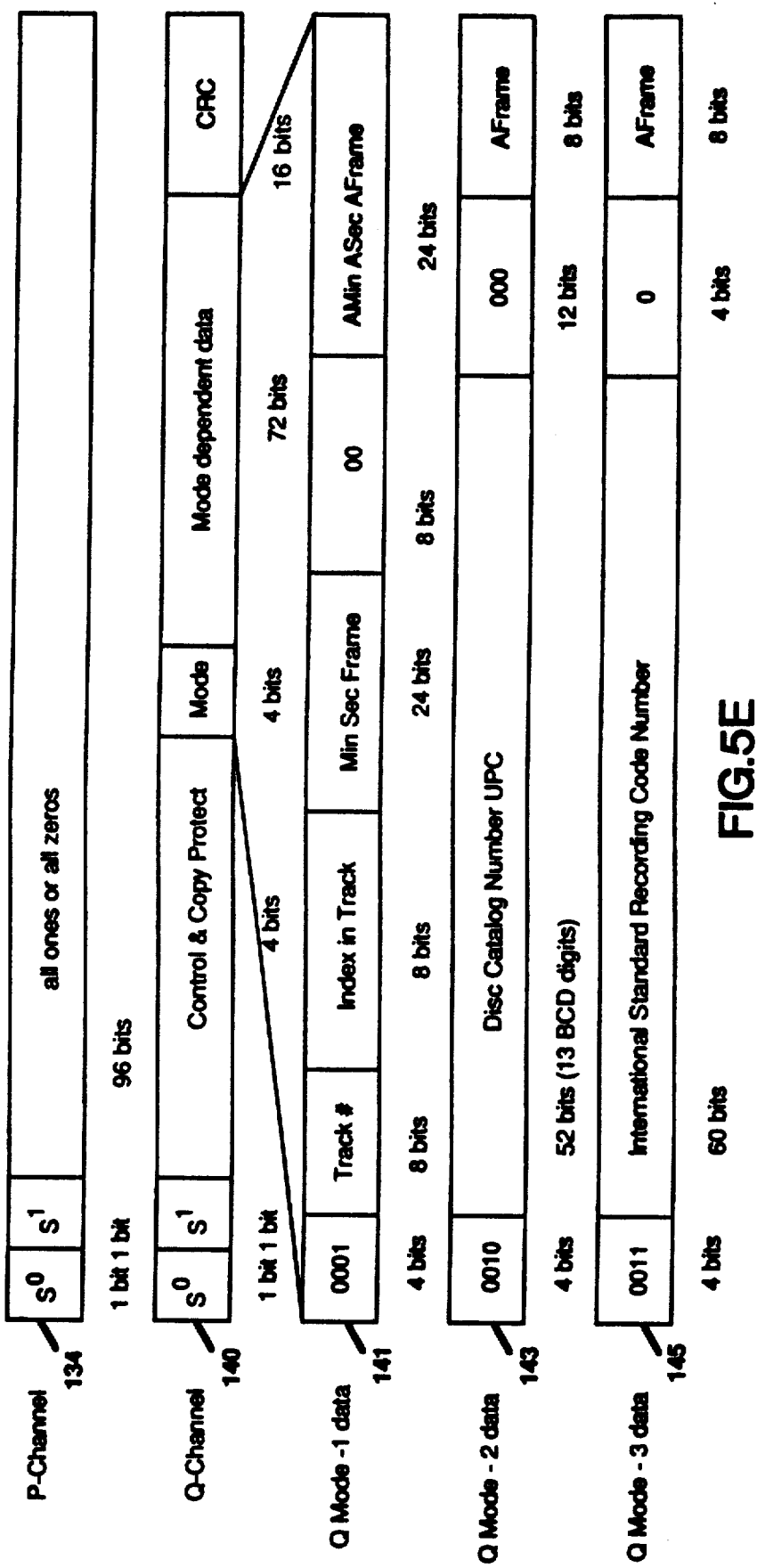
FIG. 5E illustrates further details of the subcodes of the CD-I data.

The subcode information on compact discs is standardized and organized in frame structures as shown in frame 128 in FIG. 5D. Each compact disc frame contains one subcode byte 130. After 98 frames, the structure repeats itself. An example of a block of subcode frame is shown in block 132 in FIG. 5D. Each subcode byte contains one bit from each of eight 96-bit words followed by two synchronization patterns. After the subcode synchronization patterns there are 96 bytes in the block. The block is arranged as eight 96-bit words labeled PQRSTUV and W. Under CD-I, the Q subcode bits is the most important byte. The P subcode byte is not used, as it was defined early on for older generations of compact disc players. On the other hand, the Q subcode bits have numerous modes and uses which can be taken advantage of by compact disc decoders with greater processing and display capabilities. See, for example, the representation of three modes—141, 142 and 143 in FIG. 5E. Moreover, the Q subcode bit permits automatic decoding of channel disc and synchronizes the pre-emphasis and de-emphasis of the compact disc player. See FIGS. 5D and 5E and Watkinson, J. D. *The Art of Digital Audio* (Focal Press: 1988) pp. 470-478.

Referring again to FIG. 5B, the FIFO 106 in the outbound Q subcode FIFO 64 maintains the Q subcode bits during the retrieval of CD-I data from the disk storage 52. The control and timing logic unit 69 is further coupled to outbound Q subcode FIFO 106 over the sync line 138 and provides control signals to interleave the correct Q subcode bit at appropriate portions of the CD-I data stream with the corresponding audio samples from the outbound sound sample FIFO 66 in FIG. 5A. Like the FIFO in the outbound sound sample FIFO, outbound Q FIFO 106 is also coupled to the status register over input ready line for monitoring whether the outbound Q FIFO 106 is empty or full. The serial output from the parallel-to-serial converter 112 is coupled to data merge unit 68 over line 114. It follows from the above, that the present invention describes a hardware solution to the task of interleaving the Q subcode with the digital audio stream. In the prior art, the interleaving problem is handled primarily by software.

FIG. 5C is a circuit diagram of the outbound (Q) R-W subcode FIFO used in the preferred embodiment of the present invention. The FIFO 116 has a 7-channel input 118 coupled to the VME system bus 46 for receiving R-W subcode bits from the disk storage 52 of the computer system. The FIFO 116 has a 7-channel output 160 coupled to a parallel to serial converter 148 in the data merge unit 68. In the preferred embodiment of the present invention, the (Q) R-W subcode FIFO 116 is a CY7C409 register. Except for Q channel, the (Q) R-W FIFO 116 in FIG. 5C is identical to the outbound Q FIFO 106 in FIG. 5B. As such, the control and timing logic unit 69 is also coupled to (Q) R-W subcode FIFO 116 over the sync line 136 and provides control signals to interleave the correct R-W subcode bit at appropriate portions of the CD-I data stream with the corresponding audio samples from the outbound sound sample FIFO 66 in FIG. 5A. The (Q) R-W FIFO 116 is also coupled to the status register over input ready line for monitoring whether the (Q) R-W FIFO 116 is empty or full. The (Q) R-W FIFO 116 has an "optional Q" output 120 coupled with a multiplexer 146 in the data merge unit 68. The function of (Q) R-W FIFO 116 is to give users the option not to use the hardware interleave of Q subcode which is performed by the outbound Q subcode FIFO 106 in FIG. 5B. As such, the R-W subcode FIFO 116 may carry the Q bit in the subcode for applications that require Q bit to be part of the subcode.

It should be understood by one skilled in the art that outbound Q subcode FIFO and the (Q) R-W FIFO may be implemented using independent channel for each subcode bit. The advantage of this alternative embodiment is to achieve higher speed in transferring digital data, such as CD-I data between computers or nodes in a computer network.

Figure 6:
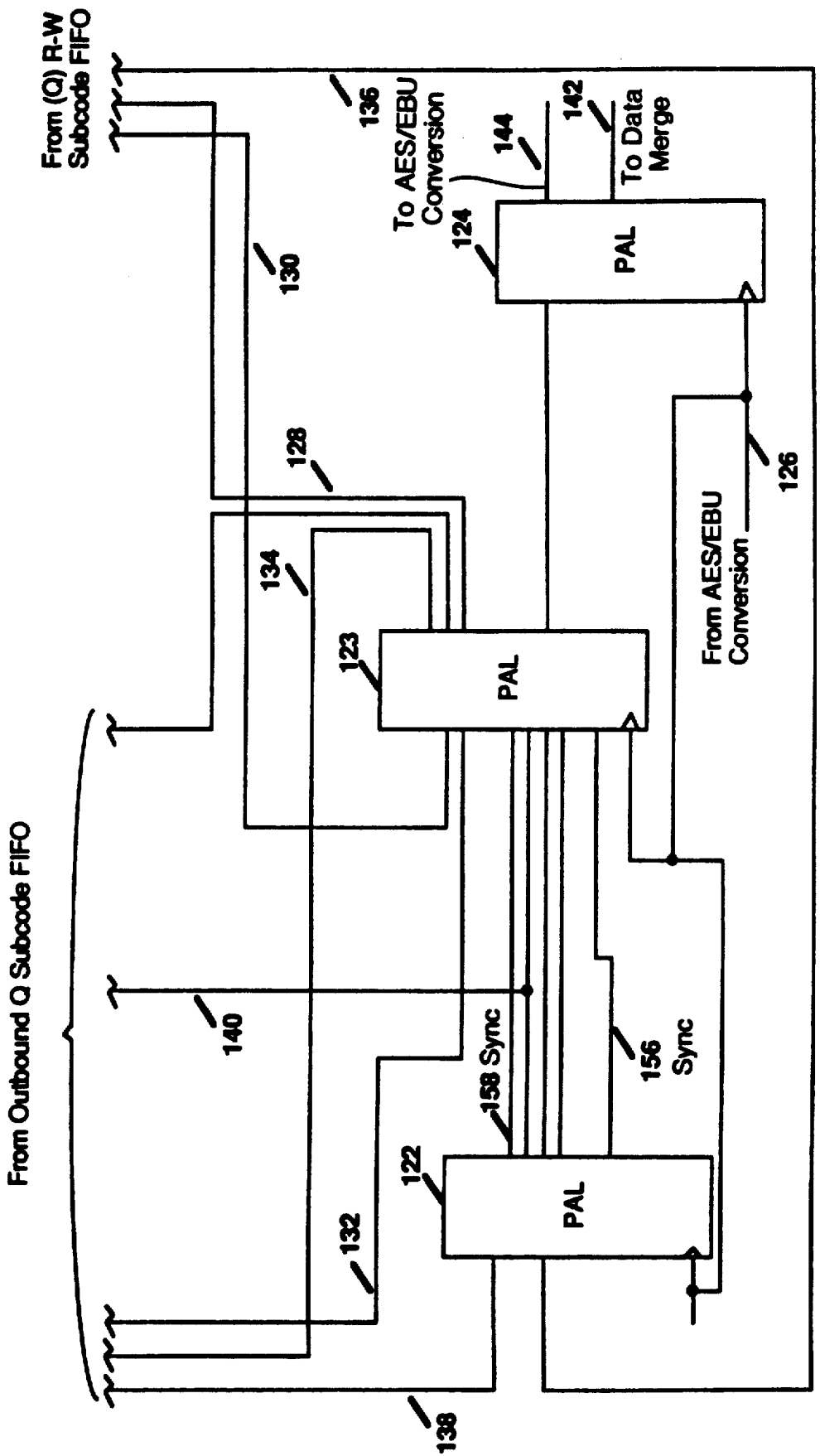
FIG. 6 is a circuit diagram of the outbound control and timing logic unit used in the preferred embodiment of the present invention.

FIG. 6 is a circuit diagram of the control and timing logic unit 69 used in the preferred embodiment of the present invention. The control and timing logic unit comprises Programmable Array Logic (PAL) 122, 123, and 124, respectively. The control and timing logic 69 is coupled to the outbound Q subcode FIFO 64 over lines 132, 134, 138 and 140, respectively. The control and timing logic unit is also coupled to the outbound (Q) R-W subcode FIFO 62 over lines 128, 130, and 136, respectively. The clock inputs 126 of PALs 122, 123 and 124 are coupled to signal 210 from the AES/EBU conversion unit 70 in FIG. 8. As mentioned above, the control and timing logic unit 69 is coupled to the outbound Q subcode FIFO 106 and (Q) R-W FIFO 116 over sync lines 136 and 138, respectively. The PAL 122 of the control and timing logic unit 69 has the sync lines 136 and 138 as inputs and further having as output the sync lines 156 and 158, respectively. As shall be described in FIG. 7 below, these sync lines are used to synchronize the outbound sound samples with the subcode data bytes and provides the proper mixing of the respective sound and subcode signals within the data merge unit 68.

Figure 7:
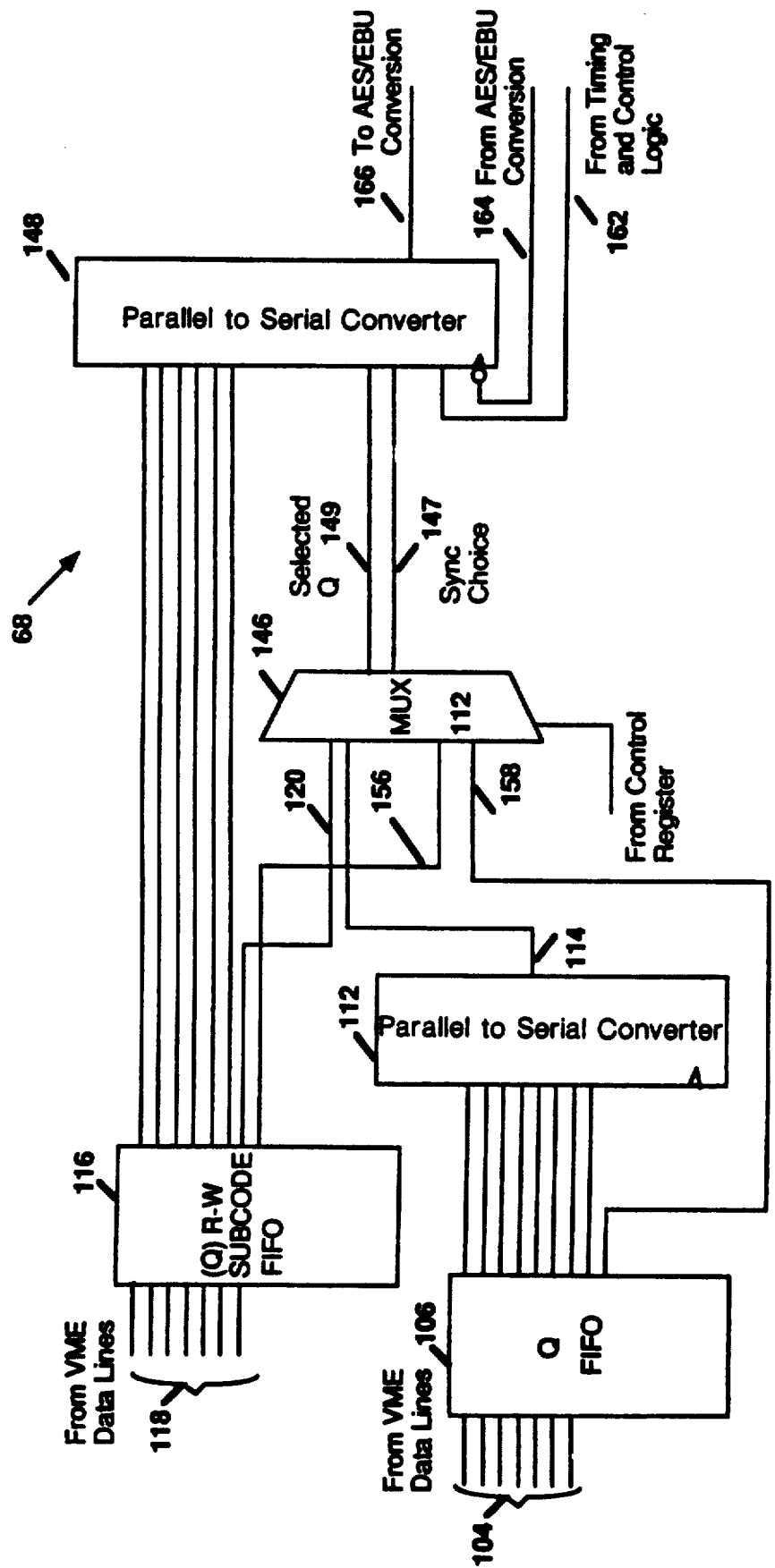
FIG. 7 is a circuit diagram of the data merge unit used in the preferred embodiment of the present invention.

FIG. 7 is a circuit diagram of the data merge unit 68 used in the preferred embodiment of the present invention. The data merge unit 68 comprises the converter 100 (not shown but see FIG. 5A), the converter 112, the converter 148 and the multiplexer 146. While the converter 100 converts parallel digital audio samples into serial data, converters 112 and 148 does the same for the subcode data. The multiplexer 146 has two sets of inputs: (1) sync lines 156 and 158 from the timing and control logic 69 (simplified graphically as direct links with FIFO 106 and FIFO 116, respectively), and (2) Q subcode lines 114 and 120 from the converter 112 and FIFO 116, respectively. The multiplexer 146 further has two outputs 147 and 149. The sync choice output 147 is a selection of one of the signals in (1), and the selected Q output 149 represents a choice of one of the two Q subcodes in (2). It follows that the multiplexer 146 selects either the Q subcode (8 bits) from the converter 112 or the R-W subcode (7 bits) from the FIFO 116. Thus, the multiplexer 146 automatically provides the appropriate timebase corrections regardless of whether the hardware interleave of the Q subcode is desired or the optional approach is chosen. The multiplexer 146 is further coulped to the parallel to serial converter 148. The converter 148 is coupled to the AES/EBU unit over the line 166. The converter 148 mixes the Q subcode byte with the R-W subcode byte and provides at this point two serial data streams, the subcode stream and the data streams that are sent onward to the AES/EBU conversion unit 70. At the multiplexer 146, Q subcode and R-W subcodes are still coming in as parallel data, but they are serialized at converter 148 before they are transferred to the AES/EBU conversion unit 70.

Figure 8:
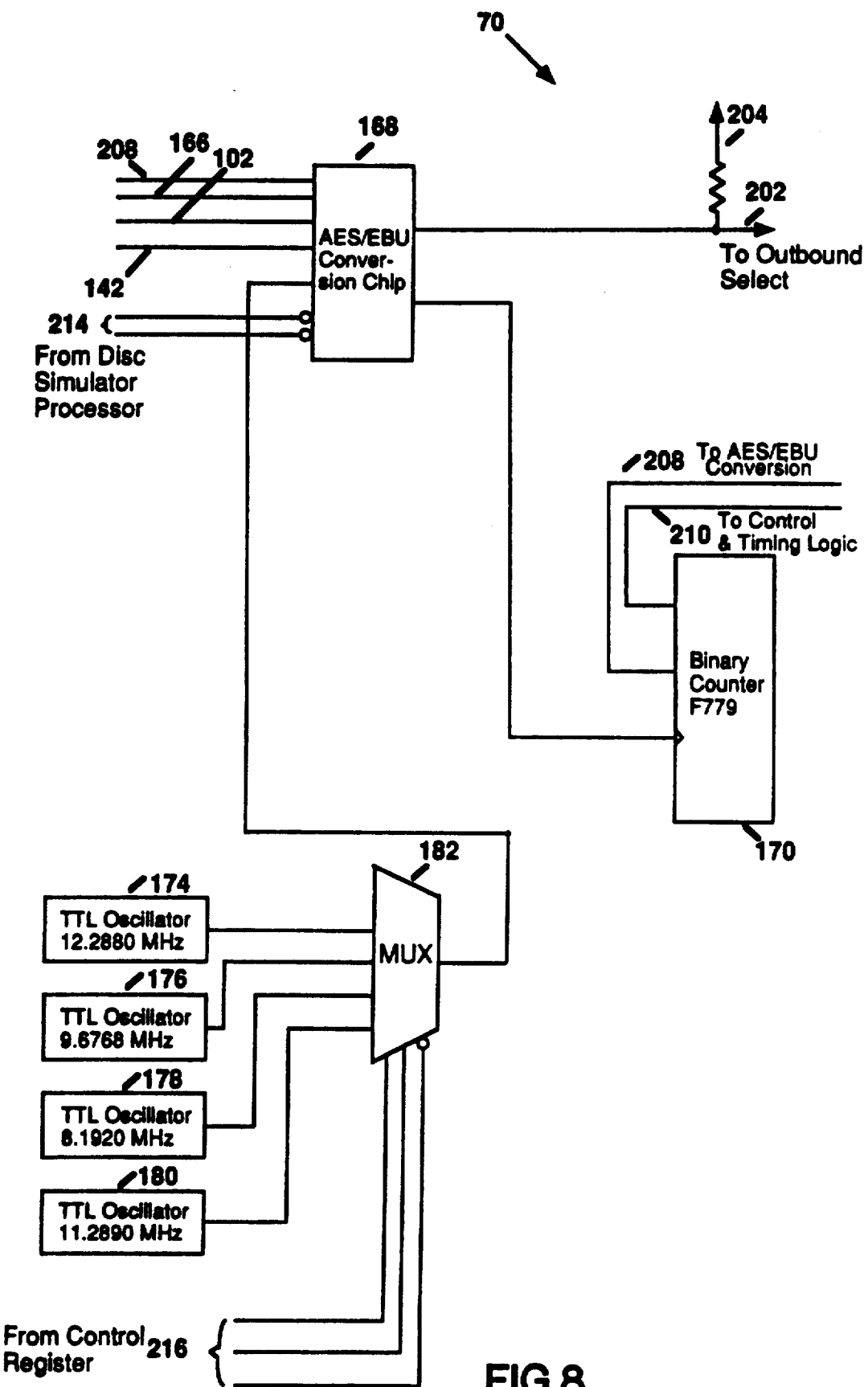
FIG. 8 is a circuit diagram of the AES/EBU conversion unit used in the preferred embodiment of the present invention.

FIG. 8 is a circuit diagram of the AES/EBU conversion unit 70 used in the preferred embodiment of the present invention. The AES/EBU conversion unit 70 comprises a AES/EBU conversion chip 168. Preferably, the converter chip 168 is a SAA7220 chip manufactured by N.V. Philips. The conversion chip 168 has five inputs 102, 166, 142, 208 and 214. Input 102 is the serial digital audio stream from the outbound sound sample FIFO 66. Input 166 is the serial subcode data stream from the data merge unit 68. The conversion chip 168 takes in serial data and serial subcodes and converts them automatically to the AES/EBU serial format. Input 142 is the control line from the control and timing logic unit 69. Input 208 is coupled to a binary counter 170 which provides timing signals for both the conversion chip 168 and the timing and control logic unit 69. Finally the input 214 is coupled to the control register 91. The conversion chip is further coupled to four TTL oscillators 174, 176, 178, and 180, respectively, over a multiplexer 182. The TTL oscillators and multiplexer arrangement permit the control register described in FIG. 4 to select one of the four data transmission speeds under the CD-I standard via lines 216. The AES/EBU output is channeled to the outbound select unit 72 over the line 202.

Figure 9:
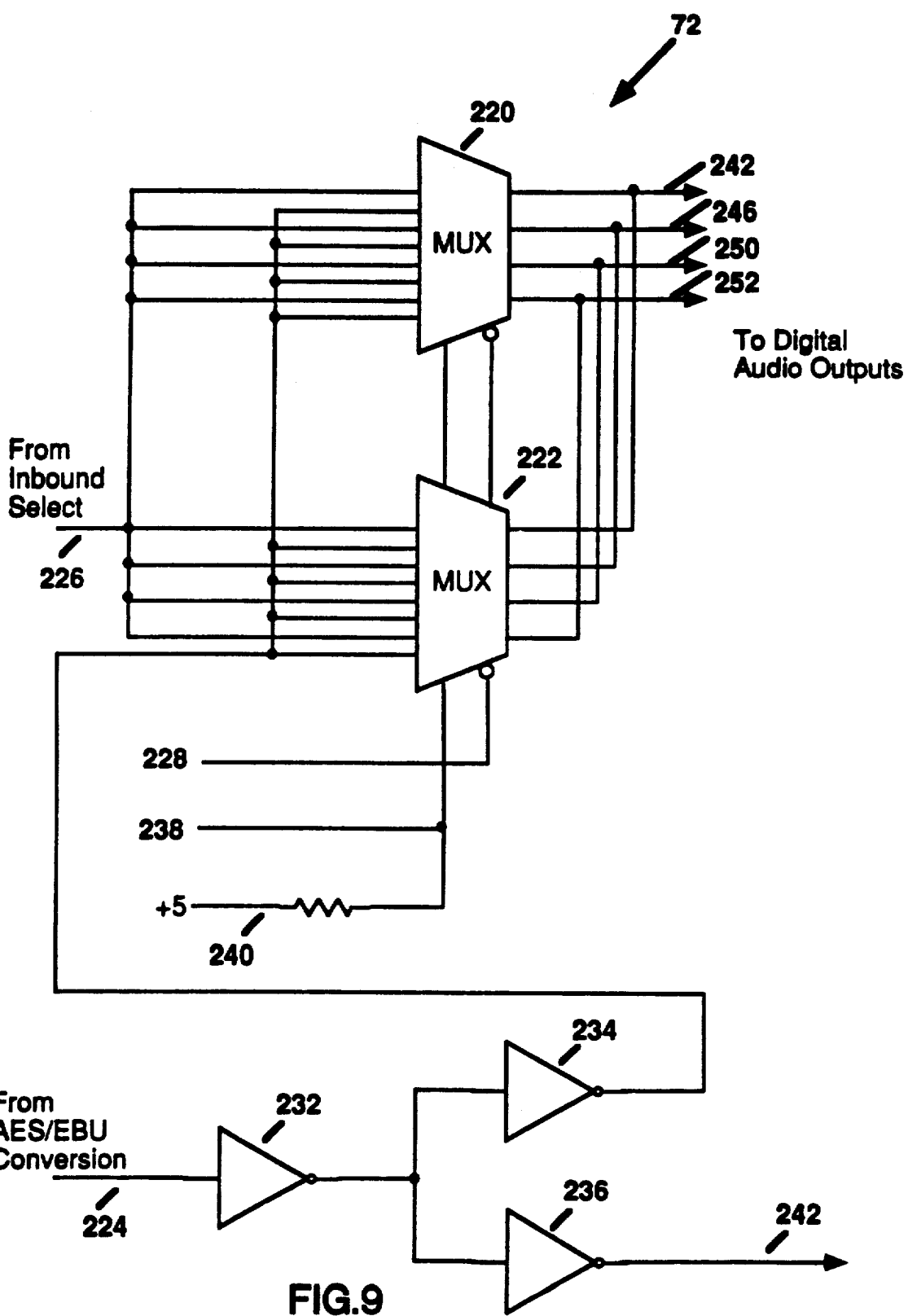
FIG. 9 is a circuit diagram of the outbound selector unit used in the preferred embodiment of the present invention.

FIG. 9 is a circuit diagram of the outbound select unit 72 used in the preferred embodiment of the present invention. The outbound select unit 72 comprises a plurality of inverters 232, 234 coupled to at least two multiplexers 220 and 222, respectively. The multiplexers 220 and 222 simultaneously select either a copy of one input signal from inbound select 82 or from outbound AES/EBU conversion unit 70 and generate four identical copies of the selection 242, 246, 250, 252. Signal 238 from the control register 91 makes the selection. Register 240 and the second MUX 222 are only required to provide additional drive current and do not affect the logical operation of the circuit. 228 is a pulldown to enable the MUX output, but it does not affect the logic of the circuit. The input to the outbound select unit 72 also provides for a test path 87 of the AES/EBU digital output to the inbound select unit 82 over line 242. The function of the test path is to enable the user to test the integrity of the various units of the present invention. One would send a test pattern via the outbound path of the present invention and compare the result of the same pattern as it retrieved via the outbound path of the present invention. If there is a discrepancy between the two, the likelihood of hardware failure of the disc simulator interface is great.

Figure 10A:
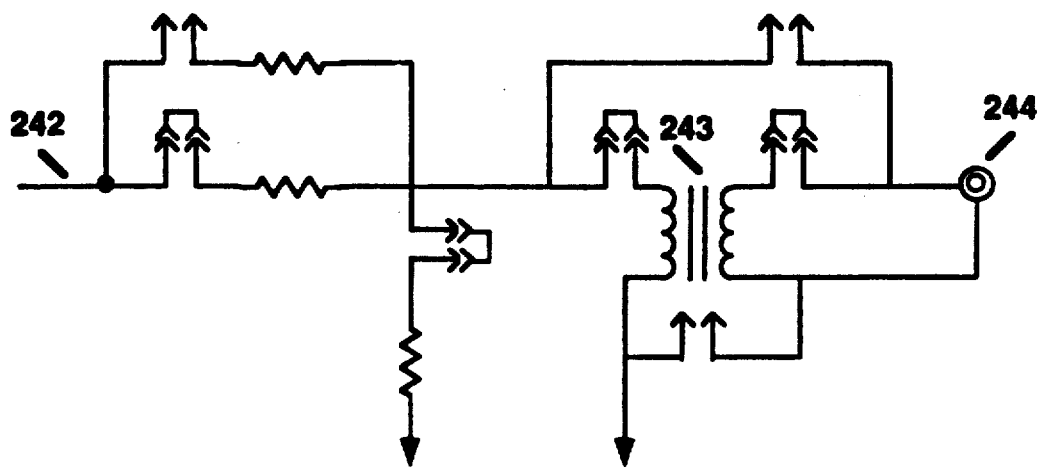
FIG. 10A is a circuit diagram of one of the four digital output ports suitable for connecting to Philips CD-I decoder.
Figure 10B:
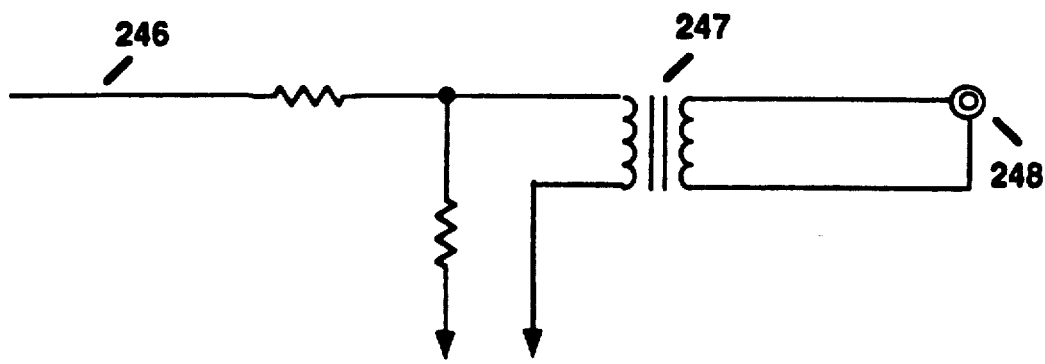
FIG. 10B is a circuit diagram of one of the four digital audio outputs suitable for connecting to Sony CD-I decoder.
Figure 11:
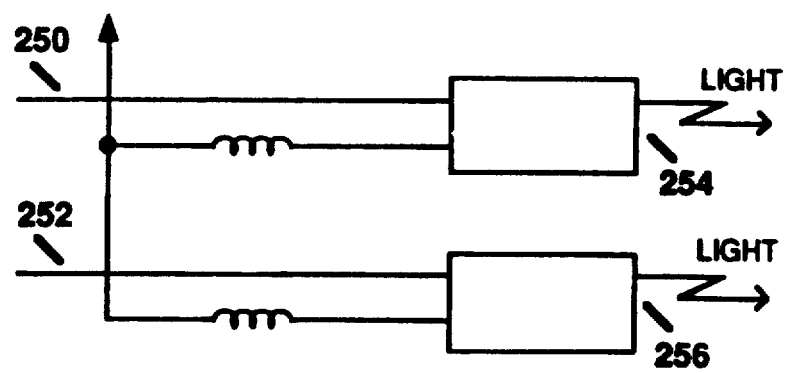
FIG. 11 is a circuit diagram of two fiber-optical transmitters permitting connection to an optical output device.

FIG. 10A is a circuit diagram of the interface suitable for connecting to a N.V. Philips or equivalent CD-I decoder. The digital audio output port comprises a RCA jack 244 and receives AES/EBU serial outputs from the outbound select unit 72 over line 242. FIG. 10B is a similar circuit diagram for an interface suitable for connecting to a Sony or equivalent CD-I decoder. The digital audio output in FIG. 10B comprises, among others, an RCA jack 248 and receives AES/EBU serial output from the outbound select unit 72 over line 246. Finally, FIG. 11 shows a pair of fiber-optical output ports. The fiber-optical interface comprises at least a pair of TOTX172 fiber-optical transmitters 254 and 256, respectively. The two transmitters receive the AES/EBU serial outputs from the outbound select unit 72 over the lines 250 and 252. It should be understood by one skilled in the art that straight-forward modifications to the circuits in FIGS. 10A, 10B, and 11 would enable a user to couple the present invention to any compact disc decoder.

The preceding paragraphs describe in detail the structure and functions of the outbound path of the disc simulator interface 60. To be described in further detail below, is an analogous inbound path for the disc simulator interface 60. Because the outbound and inbound paths of the disc simulator interface are implemented with separate circuits, the storing and replaying of digital compact disc data can be achieved simultaneously. It should be understood by one skilled in the art that the AES/EBU audio input ports should be similar to the digital audio output ports. As such, the detailed description would not duplicate the descriptions for FIG. 10A, 10B and 11 for the inbound path of the disc simulator interface.

Figure 12:
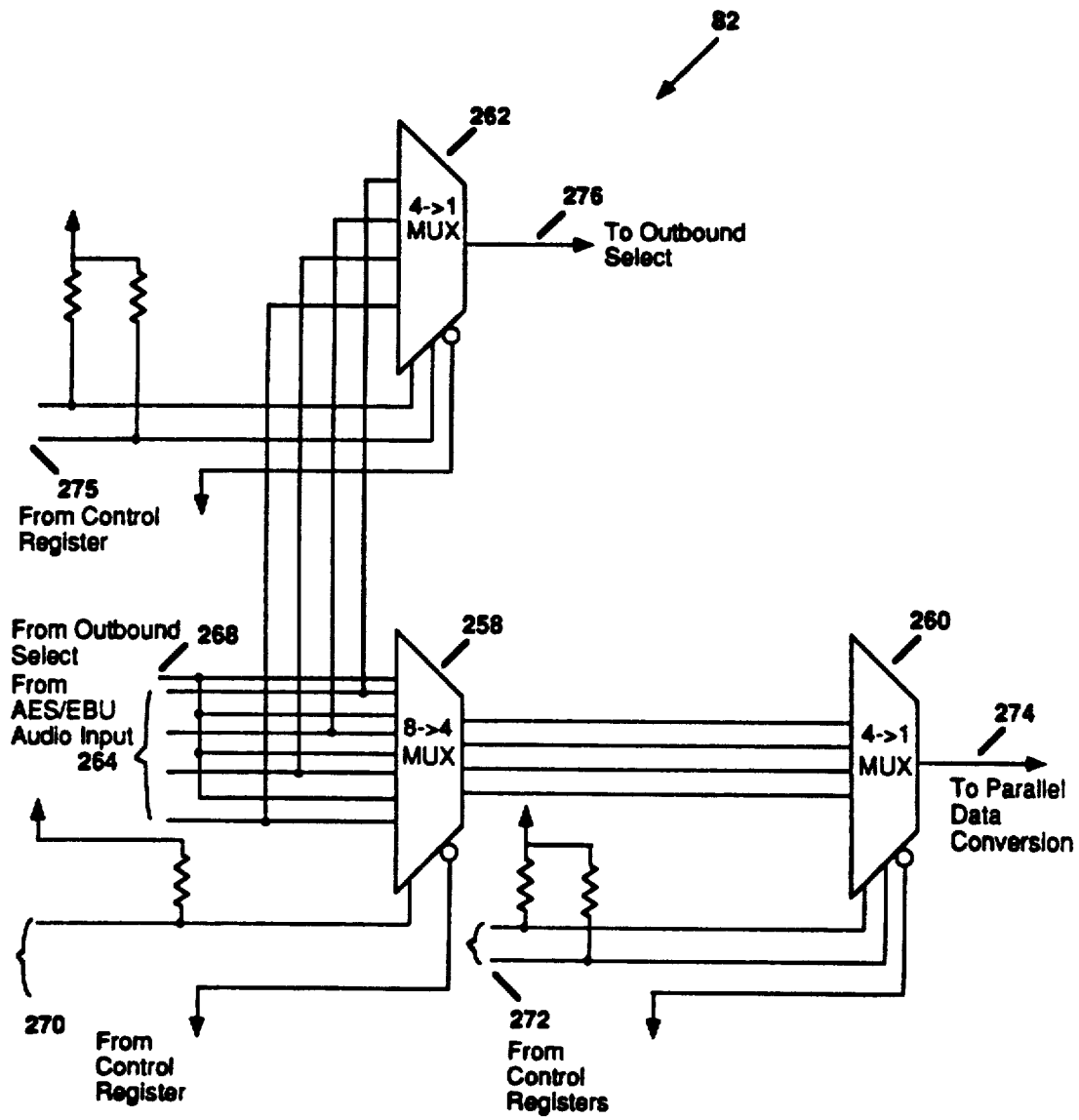
FIG. 12 is the inbound selector unit for the AES/EBU audio input used in the preferred embodiment of the present invention.

FIG. 12 is a circuit diagram of the inbound select unit 82 used in the preferred embodiment of the present invention. The inbound select unit 82 comprises a plurality of multiplexers 258, 260 and 262, respectively. The multiplexers 258 and 262 are coupled at their inputs to the AES/EBU audio input ports 78 and 80 over lines 264. Furthermore, the multiplexer 258 receives the loop back signals from the outbound selector unit 72 over line 268. The multiplexers 258, 260 and 276 are further coupled to the control registers over lines 270, 272 and 275, respectively. The multiplexer 258 is coupled to the inputs of the multiplexer 260. The multiplexer 260 is further coupled to the AES/EBU conversion unit 84 over lines 274. The multiplexer 262 is further coupled to the outbound select unit 72, thereby providing an input bypass 85 over the line 276. The input bypass 85 permits the user to listen simultaneously to the AES/EBU audio inputs as the disc simulator interface receives such digital audio inputs.

Figure 13:
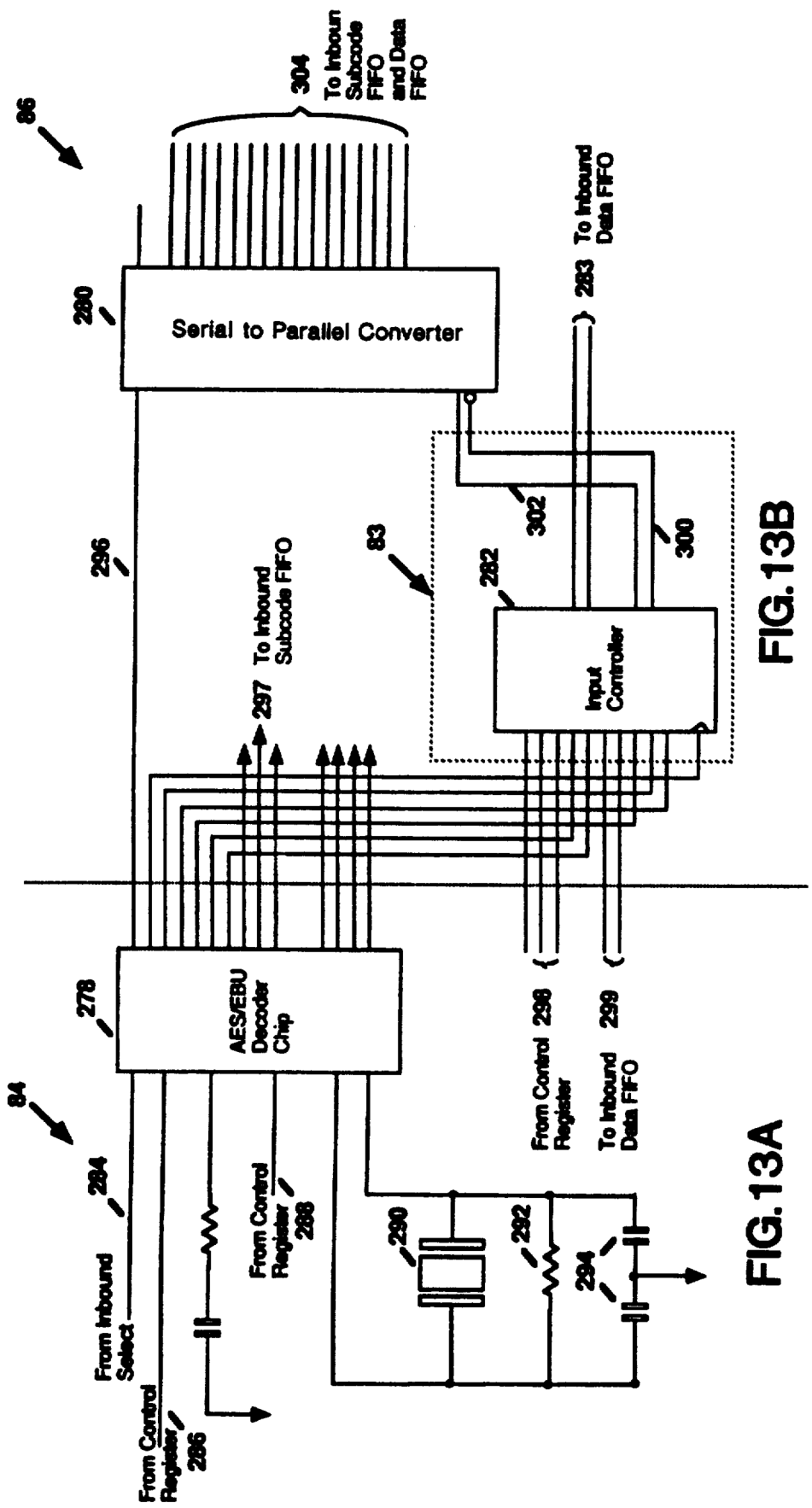
FIG. 13A is a circuit diagram of the inbound AES/EBU conversion unit used in the preferred embodiment of the present invention.
FIG. 13B is a circuit diagram of the parallel data conversion/demerge unit and of the inbound control and timing logic unit used in the preferred embodiment of the present invention.

FIG. 13A is a circuit diagram of the AES/EBU conversion and FIG. 13B is the parallel data conversion/demerge unit of the inbound path of the present invention. The parallel data conversion unit 86 comprises an AES/EBU decoder chip 278 coupled to a serial-to-parallel data converter 280 and further coupled to an input counter 282. The decoder chip 278 is preferably a YM3623D manufactured by Yamaha. The decoder chip 278 receives AES/EBU serial audio signals in the fully mixed version. The decoder chip 278 un-mixes the AES/EBU audio inputs to generate two separate serial streams—one subcode stream, and another data stream. The decoder chip 278 is coupled to a crystal 290 in parallel with a resistor 292 and grounded over two capacitors 294 as a simple crystal clock oscillator. The decoder chip 278 is coupled to a serial-to-parallel data converter 280 over an input controller 282. The input controller 282 is part of the inbound control and timing unit 83. The input controller is preferably a PAL 22V10. The serial-to-parallel converter chip 280 converts the serial digital audio input streams from the decoding chip 278 into parallel streams which are suitable for data transfer on the VME system bus 46. The serial-to-parallel converter 280 is coupled to inbound data FIFO 90 and inbound subcode FIFO 88 over lines 304. The parallel data streams from lines 304 are further time multiplexed to generate 32 bit data. The crystal oscillator 290, coupled to the decoder chip 278, permits the parallel data conversion units to transfer AES/EBU audio signals at any one of four CD-I speeds, or others.

Figure 14:
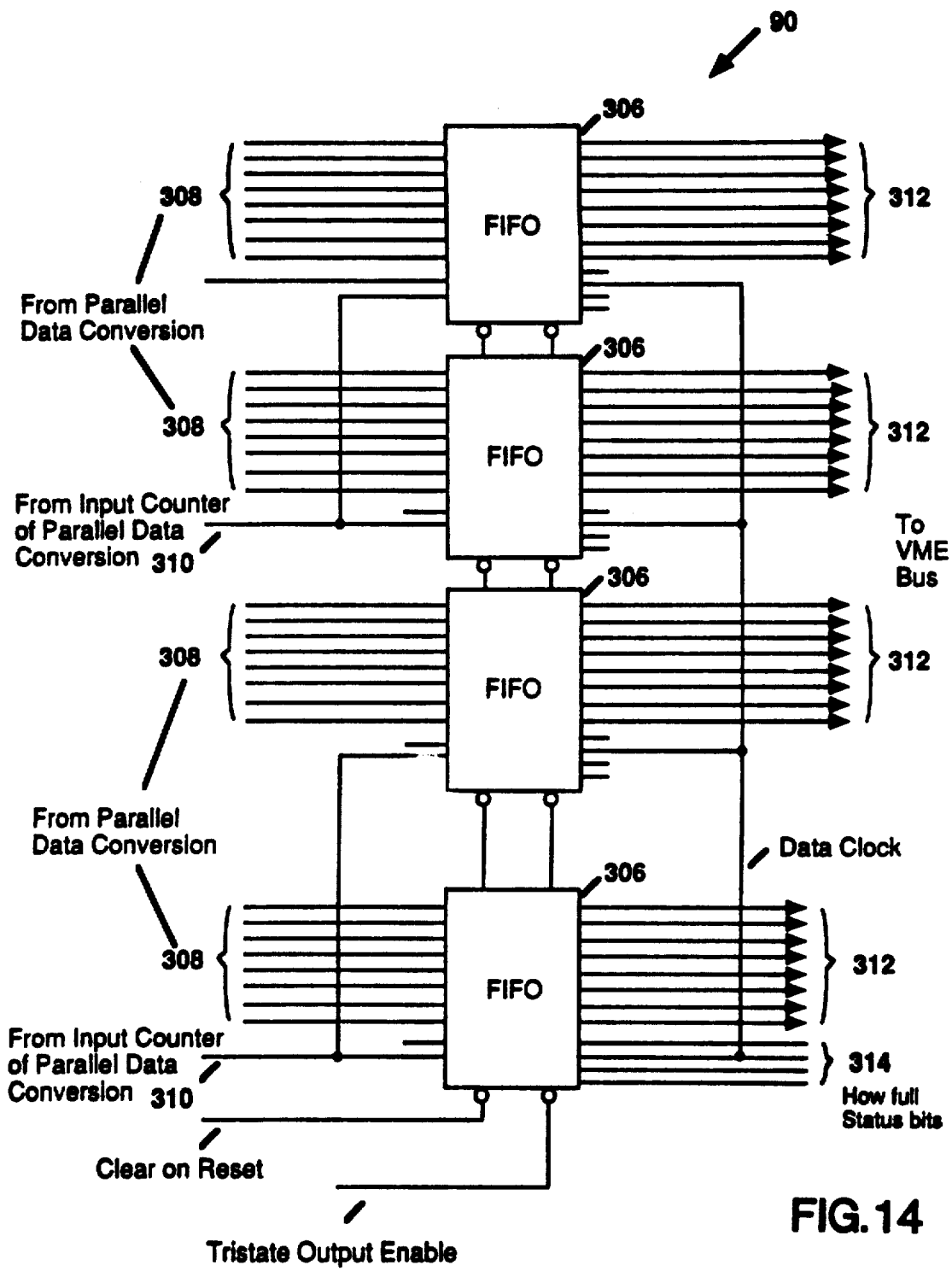
FIG. 14 is a circuit diagram of the inbound data FIFO used in the preferred embodiment of the present invention.

FIG. 14 is a circuit diagram of the inbound data FIFO 90 used in the preferred embodiment of the present invention. The inbound data FIFO comprises a plurality of FIFO registers 306. In the preferred embodiment of the present invention, FIFO 90 are CY7C408 registers. The registers are coupled to the serial-to-parallel converter data 280 in the parallel data conversion unit 86. The FIFO 306 are further coupled to the VME bus 46 over lines 312. The FIFO registers 306 and inbound data FIFO 90 holds the parallel data from the parallel data conversion unit 86 for up to 1 millisecond. 310 comes from the input timing and control logic and clocks the data from the serial to parallel converter into the data FIFO at the correct time. 314 are status signals to the status register that allow software to see how full the data register is. All four chips are connected to the shift out clock. When data is read over the VME bus, that signal clocks the data out of the FIFO.

Figure 15:
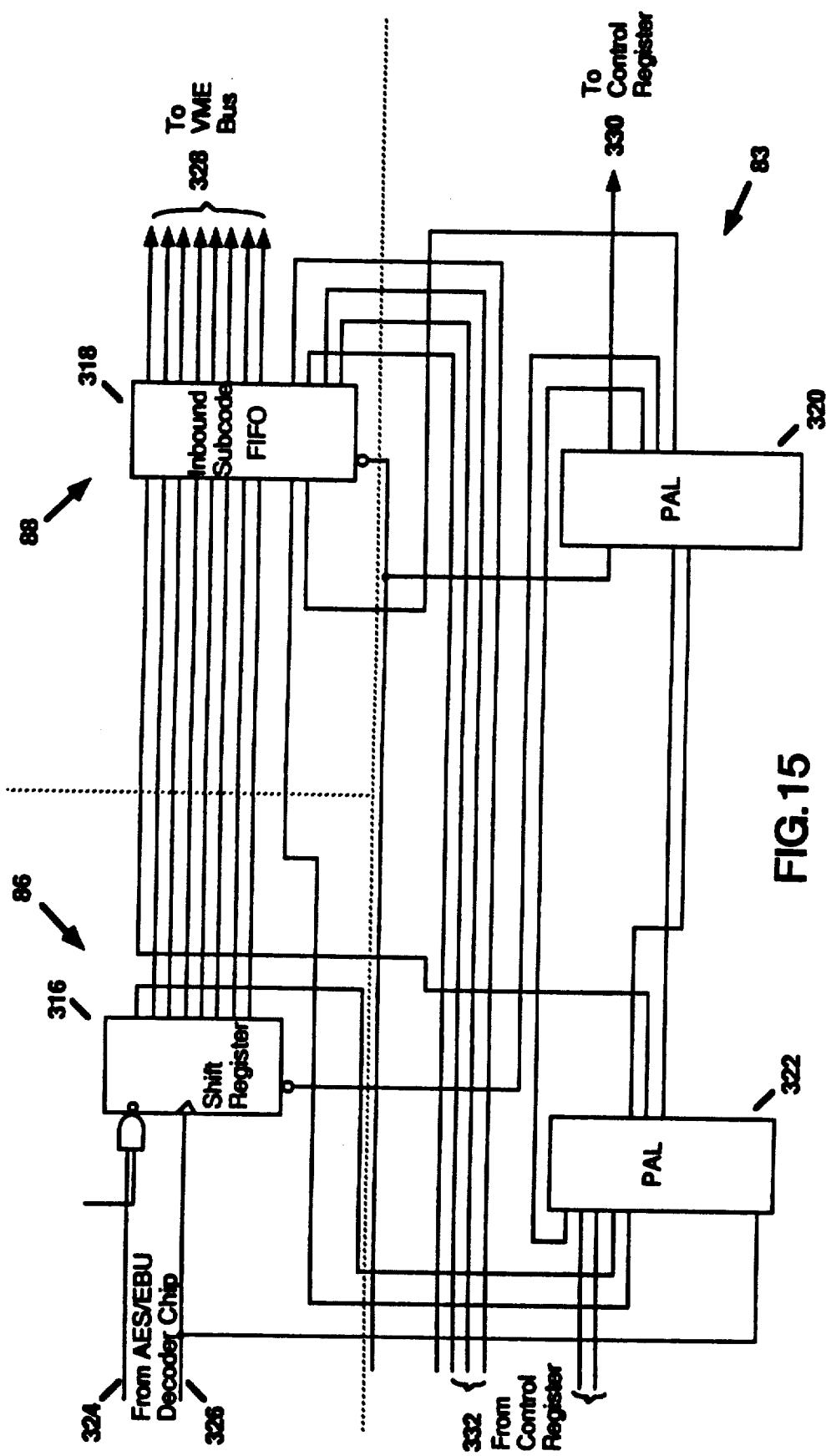
FIG. 15 is a circuit diagram of the inbound subcode FIFO used in the preferred embodiment of the present invention.

FIG. 15 is a circuit diagram of the inbound subcode FIFO in the preferred embodiment of the present invention. The inbound subcode FIFO 88 comprises a FIFO 318. Preferably, FIFO 318 is a CY7C408 register. The FIFO 318 has a plurality of inputs coupled to the outputs of a shift register 316 in parallel conversion/demerge unit 86. The shift register 316 receives serial data from the AES/EBU decoder chip 278 over lines 324 and 326. The shift register 316 receives the Q subcode serially over the line 324 and the clock signal from the decoding chip 278 over the line 326. The inbound control and timing logic unit 83 comprises a PAL 320 and a PAL 322. The PAL 322 is coupled to the decoder chip 278 in the AES/EBU conversion unit 84 over the line 326. The PAL 322 is further coupled to PAL 320. The two PALs provide the timing for the inbound subcode FIFO. The FIFO register 318 is coupled to the VME bus 46 over lines 328. The parallel subcode data stream is transferred along with the data streams over the VME system bus 46 over the lines 328. The inbound subcode FIFO 88 also features a subcode overrun diagnostic scheme. The PAL 320 is coupled to the control register over the line 330. The line 330 transfers an overrun subcode signal to notify the control register there has been an overrun of the parallel subcode data stream.

Figure 16:
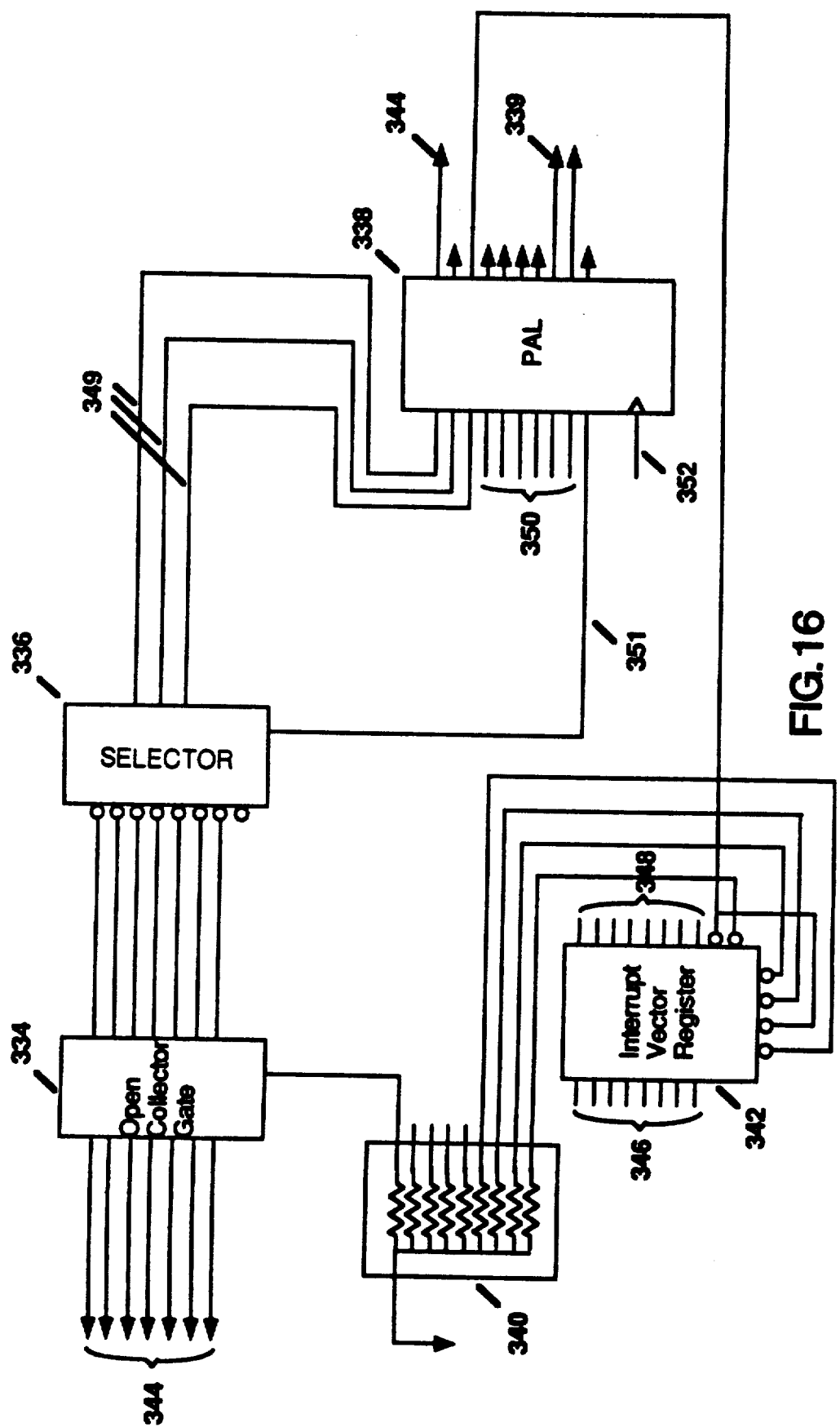
FIG. 16 is a circuit diagram of the interrupt generating circuit used in the disk simulator interface board of the preferred embodiment of the present invention.

FIG. 16 is a circuit diagram of the interrupt handling circuit used in the preferred embodiment of the present invention. The interrupt handling circuit comprises an open collector gate 334 coupled to the multiplexer 336 which is further coupled to a PAL 338. Interrupt circuit can be described as a separate function of the disc simulator interface. It is intended to let either the disc simulator processor or the host processor (the UNIX CPU) send an interrupt to the other. Lines 348 and 349 come from the control register and allow the software of either processor to set an interrupt vector 348 and interrupt level 349 as defined in the VME specification. 351 also comes from the control register and enables the interrupt to occur. 336 selects an interrupt single line from the 3 bit code 349 and 334 drives the interrupt onto the VME bus interrupt lines 344. As per the VME specification, the interrupt is acknowledged on the bus. This acknowledgment is decoded via PAL 338 looking at signals 350, returning interrupt acknowledge 344 and driving the value of 348 onto the bus as the interrupt vector on signals 346. The chip 342 does the driving under control of signal 339 from PAL 338.

While the present invention has been particularly described with reference to FIG. 1 to FIG. 16 and with emphasis on digital audio and certain circuits, it should be understood that the figures are for illustration only and should not be taken as limitation upon the invention. It is within the contemplation of the present invention to reduce the digital computer interface to a single LSI chip such that computers may retrofitted with it to share and transfer digital data. Alternatively, the present invention may be incorporated as co-processor for interfacing digital computer with computer disc and CD-I decoders. In addition, it is clear that the method and apparatus of the present invention has utility in any application where the recording and replaying of compact disc data is required. It is contemplated that many changes and modifications may be made by one of ordinary skill in the art without departing from the spirit and scope of the invention as disclosed above.

We claim:

1. An apparatus for storing audio signals in a memory of a computer system such that said signals are retrieved and reproduced in real time, said computer system including a central processing unit (CPU) being coupled to an auxiliary processor and said memory over a system bus, said apparatus comprising:

an input terminal for receiving said audio signals, said audio signals being represented by a predetermined number of consecutive frames, each said frames having at least one sync word, at least one subcode symbol and a plurality of associated audio samples;

first conversion unit coupled to said input terminal for separating said subcode symbol from said audio samples of said signals;

a demerge unit coupled to said first conversion unit for receiving said subcode symbol and said audio samples therefrom, said demerge unit further converting the format of said subcode symbol and said audio samples into a format suitable for storing the same in said memory over said system bus;

first buffering means coupled to said demerge unit for receiving said audio samples therefrom, said first buffering means coupled to said system bus, said first buffering means further holding said audio samples;

second buffering means coupled to said demerge unit for receiving said subcode symbol therefrom, said second buffering means coupled to said system bus, said second buffering means further holding said subcode symbol;

a first timing and control unit having a first input, a second input, a third input and a fourth input to said first buffering means, said second buffering means, said demerge unit and said conversion unit, respectively, for synchronizing the transfer of said subcode symbol and said audio samples from said conversion unit to said memory over said system bus;

third buffering means coupled to said system bus for retrieving said audio samples from said memory, said third buffering means further holding said audio samples;

a first parallel-to-serial converter, said first parallel-to-serial converter being coupled to said third buffering means for serializing said audio samples, fourth buffering means coupled to said system bus for retrieving a subset of said subcode symbol and a first sync bit from said memory, said fourth buffering means further holding said subset of said subcode symbol;

a second parallel-to-serial converter, said second parallel-to-serial converter being coupled to said fourth buffering means for receiving said subset of said subcode symbol;

fifth buffering means coupled to said system bus for retrieving said subcode symbol and a second sync bit from said memory, said fifth buffering means further holding said subcode symbol;

a third parallel-to-serial converter, said third parallel-to-serial converter being coupled to said fifth buffering means for serializing said subcode symbol and said second sync bit;

a multiplexer, said multiplexer coupled to said third parallel-to-serial converter, said fourth buffering means being further coupled to said multiplexer for transmitting said first sync bit thereto, said multiplexer selecting either said first sync bit or said second sync bit as a chosen sync word for each said frames, said multiplexer being coupled to said second parallel-to-serial converter for combining said chosen sync word with said subset of said subcode symbol;

a second conversion unit coupled to said first parallel-to-serial converter for receiving said audio samples therefrom, said second conversion unit being coupled to said second parallel-to-serial converter for receiving said subset of said subcode symbol and said chosen sync word therefrom, said second conversion unit further combining said chosen sync word, said subset of said subcode symbol and said audio samples into a frame suitable for reproducing said signals in real time;

a second timing and control unit having a fifth input, a sixth input, a seventh input, an eight input and a ninth input to said third buffering means, said fourth buffering means, said fifth buffering means, said multiplexer and said second conversion unit, respectively, for synchronizing retrieval and combination of said chosen sync word, said subset of said subcode symbol and said audio samples in real time; and an output terminal coupled to said second conversion unit, said output terminal for reproducing said signals in real time.

2. The apparatus as defined in claim 1, wherein said first conversion unit includes a decoding circuit.

3. The apparatus as defined in claim 1, wherein said format suitable for storing said subcode symbol and said audio samples is a computer file.

4. The apparatus as defined in claim 1, wherein said first timing and control unit includes a plurality of registers, said registers being coupled to said auxiliary processor, said auxiliary processor sending control signals to said CPU over said system bus when its memory is either almost full or almost empty.

5. The apparatus as defined in claim 1, wherein said first buffering means includes a plurality of FIFOs.

6. The apparatus as defined in claim 1, wherein said second buffering means includes a plurality of FIFOs.

7. The apparatus as defined in claim 1, wherein said third buffering means includes a plurality of FIFOs.

8. The apparatus as defined in claim 1, wherein said fourth buffering means includes a plurality of FIFOs.

9. The apparatus as defined in claim 1, wherein said fifth buffering means includes a plurality of FIFOs.

10. The apparatus as defined in claim 1, wherein said second conversion unit includes a serialization circuit.

11. The apparatus as defined in claim 1, wherein said input terminal is coupled to said output terminal for reproducing said audio signals while storing the same in said memory.

12. The apparatus as defined in claim 1, wherein the output of said second conversion unit is coupled to said input terminal for checking the integrity of the various circuits of said apparatus.

13. A method for storing audio signals in a memory of a computer system such that said signals are retrieved and reproduced in real time, said computer system including a central processing unit (CPU) coupled to an auxiliary processor and said memory over a system bus, the steps comprising:

receiving said audio signals over an input terminal, said audio signals being represented by a predetermined number of consecutive frames, each said frames having at least one sync word, at least one subcode symbol and a plurality of associated audio samples;

separating said subcode symbol from said audio samples of said signals with a first conversion unit, said first conversion unit being coupled to said input terminal;

receiving said subcode symbol and said audio samples with a demerge unit coupled to said first conversion unit, said demerge unit further converting the format of said subcode symbol and said audio samples into a format suitable for storing said subcode symbol and said audio samples in said memory over said system bus;

receiving said audio samples with a first buffering means coupled to said demerge unit, said first buffering means coupled to said system bus, said first buffering means further holding said audio samples;

receiving said subcode symbol with a second buffering means coupled to said demerge unit, said second buffering means coupled to said system bus, said second buffering means further holding said subcode symbol;

synchronizing the transfer of said subcode symbol and said audio samples from said conversion unit to said memory over said system bus with a first timing and control unit having a first input, a second input, a third input and a fourth input to said first buffering means, said second buffering means, said demerge unit and said first conversion unit, respectively;

retrieving said audio samples from said memory with a third buffering means coupled to said system bus, said third buffering means further holding said audio samples;

retrieving a subset of said subcode symbol and a first sync bit from said memory with a fourth buffering means coupled to said system bus, said fourth buffering means further holding said subset of said subcode symbol;

retrieving said subcode symbol and a second sync bit from said memory with a fifth buffering means coupled to said system bus, said fifth buffering means further holding said subcode symbol;

serializing said audio samples using a first parallel-to-serial converter, said first parallel-to-serial converter being coupled to said third buffering means;

serializing said subcode symbol and said second sync bit using a third parallel-to-serial converter, said third parallel-to-serial converter being coupled to said fifth buffering means;

receiving with a multiplexer said first sync bit from said fourth buffer means and said second sync bit from said third parallel-to-serial converter, said data merge unit coupled to said third parallel-to-serial converter and to said fourth buffer means, further selecting, with said multiplexer, one of said first or second sync bits as a chosen sync word for each said frames;

serializing said subset of said subcode symbol using a second parallel-to-serial converter, said second parallel-to-serial converter being coupled to said fourth buffering means for receiving said subset of said subcode symbol and coupled to said multiplexer for receiving said chosen sync word;

receiving said audio samples with a second conversion unit coupled to said third buffering means, said second conversion unit being coupled to said second parallel-to-serial converter for receiving said subset of said subcode symbol and said sync word therefrom, said second conversion unit further combining said sync word, said subset of said subcode symbol and said audio samples into a frame suitable for reproducing said signals in real time;

synchronizing the retrieval and combination of said sync word, said subcode symbol and said audio samples in real time with a second timing and control unit having a fifth input, a sixth input, a seventh input, an eighth input and a ninth input to said third buffereing means, said fourth buffering means, said fifth buffering means, said multiplexer and said second conversion unit, respectively; and reproducing said signals in real time with an output terminal, said output terminal coupled to said second conversion means.

14. The method as defined in claim 13, wherein said first conversion unit includes a decoding circuit.

15. The method as defined in claim 13, wherein said format suitable for storing said subcode symbol and said audio samples is a computer file.

16. The method as defined in claim 13, wherein said first timing and control unit includes a plurality of registers, said registers being coupled to said auxiliary processor, said auxiliary processor sending control signals to said CPU over said system bus when its memory is either almost full or almost empty.

17. The method as defined in claim 13, wherein said first buffering means includes a plurality of FIFOs.

18. The method as defined in claim 13, wherein said second buffering means includes a plurality of FIFOs.

19. The method as defined in claim 13, wherein said third buffering means includes a plurality of FIFOs.

20. The method as defined in claim 13, wherein said fourth buffering means includes a plurality of FIFOs.

21. The method as defined in claim 13, wherein said fifth buffering means includes a plurality of FIFOs.

22. The method as defined in claim 13, wherein said second conversion unit includes a serialization circuit.

23. The method as defined in claim 13, wherein said input terminal is coupled to said output terminal for reproducing said audio signals while storing the same in said memory.

24. The method as defined in claim 13, wherein the output of said second conversion unit is coupled to said input terminal for checking the integrity of the various circuits of said apparatus.

* * * * *